US007677045B2

(12) United States Patent
Jorgensen et al.

(10) Patent No.: US 7,677,045 B2

(45) Date of Patent: Mar. 16, 2010

(54) GAS TURBINE TRANSITION DUCT

(75) Inventors: Stephen W. Jorgensen, Stuart, FL (US); Heather Johnston, Stuart, FL (US)

(73) Assignee: Power Systems Mfg., LLC, Jupiter, FL (US)

( * ) Notice: Subject to any disclaimer, the term of this patent is extended or adjusted under 35 U.S.C. 154(b) by 1006 days.

(21) Appl. No.: 11/404,343

(22) Filed: Apr. 14, 2006

(65) Prior Publication Data

US 2007/0240422 A1 Oct. 18, 2007

(51) Int. Cl.
*F02C 1/00* (2006.01)
*F02G 3/00* (2006.01)

(52) U.S. Cl. ........................... 60/752; 60/39.37; 60/796

(58) Field of Classification Search .................... 60/752
See application file for complete search history.

(56) References Cited

U.S. PATENT DOCUMENTS

| | | | | |
|---|---|---|---|---|
| 5,983,641 | A * | 11/1999 | Mandai et al. | 60/722 |
| 6,644,032 | B1 * | 11/2003 | Jorgensen et al. | 60/752 |
| 2006/0069533 | A1 | 3/2006 | Florea et al. | |

* cited by examiner

*Primary Examiner*—Michael Cuff
*Assistant Examiner*—Craig Kim

(57) ABSTRACT

A transition duct having a panel assembly with an inlet end of generally circular cross section and an outlet end having a generally rectangular arc-like cross section is disclosed. The panel assembly has an uncoated internal profile substantially in accordance with coordinate values X, Y, and Z as set forth in Table 1. The coordinates are taken at a sweep angle θ wherein θ is an angle measured from the inlet end and X, Y, and Z are coordinates defining the panel assembly profile at each angle θ from the inlet end. An alternate embodiment is also disclosed defining an envelope for the uncoated internal profile of the panel assembly.

18 Claims, 7 Drawing Sheets

GAS TURBINE TRANSITION DUCT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This invention relates to a transition duct for a gas turbine engine, specifically to a novel and improved profile for a transition duct that results in lower operating stresses and extended component life.

In a typical can annular gas turbine engine, a plurality of combustors are arranged in a generally annular array about the engine. The combustors receive pressurized air from the engine's compressor, adds fuel to create a fuel/air mixture, and combusts that mixture to produce hot gases. The hot gases exiting the combustors are utilized to turn a turbine, which is coupled to a shaft that drives a generator for generating electricity.

The hot gases are transferred from the combustor to the turbine by a transition duct. Due to the position of the combustors relative to the turbine inlet, the transition duct must change cross-sectional shape from a generally cylindrical shape at the combustor exit to a generally rectangular arc-like shape at the turbine inlet. In addition, the transition duct undergoes a change in radial position, since the combustors are typically mounted outboard of the turbine. Extreme care must be taken with respect to the design of these ducts in order to avoid sharp geometric changes, otherwise regions of high stress and stress concentrations can occur. The combination of complex geometry changes as well as extreme mechanical and thermal loading seen by the transition duct can create a harsh operating environment that can lead to premature deterioration, requiring repair and replacement of the transition ducts. To withstand the hot temperatures from the combustor gases, transition ducts are typically air-cooled. A variety of methods are available to provide cooling such as through internal channels, impingement cooling, or effusion cooling.

Severe cracking, resulting in component failure and forcing engine shutdown, has been known to occur in transition ducts having extremely sharp geometry changes and internal air-cooled channels. In such an incident, the engine requires transition ducts replacement or repair prior to returning to operational status. The present invention seeks to overcome the shortfalls of these prior art designs.

SUMMARY

The present invention is defined by the claims below. Embodiments of the present invention solve at least the above problems by providing an apparatus for a transition duct having a geometric profile that results in lower operating stresses and improved component life.

In an aspect of the present invention, a transition duct is provided having an inlet ring, an aft frame, and a panel assembly having an internal profile defined by a series of X, Y, and Z Cartesian coordinates taken along a sweep angle θ.

A novel and improved transition duct having an enhanced profile for improved performance and durability is provided. The internal flowpath geometry of the transition duct has been configured to remove areas of sharp geometric change. The sharp geometric changes, in combination with high thermal and mechanical loading, caused regions of high steady and vibratory stresses and local stress concentrations in prior art ducts that often lead to cracking and premature failure. Furthermore, due to a rounder profile, certain natural frequencies of the transition duct are raised to avoid potential vibratory issues.

A variety of cooling methods can be used in combination with the enhanced profile of the present invention transition duct. In an embodiment, the cooling system continues to use air, but the air is directed through a plurality of effusion holes in the panel assembly of the transition duct. Effusion cooling provides more uniform cooling of the transition duct than the plurality of internal cooling channels used in the prior art, which were also a source of stress concentrations.

In an embodiment of the present invention, there is provided a transition duct with a panel assembly having an inlet end of generally circular cross section and an outlet end having a generally rectangular arc-like cross section with an uncoated internal profile substantially in accordance with the coordinate values θ, X, Y, and Z as set forth in Table 1. The origin of the coordinate system is positioned at the center of the panel assembly inlet end along a centerline axis. It will be appreciated that the coordinate values given are for manufacturing purposes, in a room temperature condition. The coordinate values X, Y, and Z in Table 1 are standard Cartesian coordinates, and correspond to a specific sweep angle θ, which together, define a cross section of the panel assembly. Each cross section is joined smoothly with adjacent cross sections to define a panel assembly for the transition duct. It will also be appreciated that as the transition duct transfers hot combustion gases from a combustor to the turbine inlet, the transition duct absorbs heat, and therefore the coordinates provided in Table 1 do not necessarily correspond to the panel assembly position when in operation at an elevated temperature.

In an alternate embodiment, there is provided a transition duct with a panel assembly having an inlet end of generally circular cross section and outlet end having a generally rectangular arc-like cross section with an uncoated internal profile within an envelope of +/−0.250 inches in a direction normal to any surface of the panel assembly substantially in accordance with the coordinate values θ, X, Y, and Z as set forth in Table 1. The origin of the Cartesian coordinate system is positioned at the center of the panel assembly inlet end along a centerline axis. A distance of +/−0.250 inches in a direction normal to any surface location along the panel assembly defines an envelope for this particular panel assembly and ensures that manufacturing tolerances are accommodated within the envelope of the panel assembly. As with the embodiment previously disclosed, it will be appreciated that the coordinate values given are for manufacturing purposes, in a room temperature condition. Each set of coordinate values X, Y, and Z in Table 1 is in standard Cartesian coordinates and corresponds to a specific sweep angle θ, which, when taken together defines a cross section of the panel assembly. Each cross section is joined smoothly with adjacent cross sections to define a panel assembly for the transition duct. It will also be appreciated that as the transition duct transfers hot combustion gases from a combustor to the turbine inlet, the transition duct heats up and therefore the Cartesian coordinates for a given θ value provided in Table 1 may not necessarily correspond to the panel assembly position when in operation at an elevated temperature.

The instant invention will now be described with particular reference to the accompanying drawings.

BRIEF DESCRIPTION OF THE SEVERAL VIEWS OF THE DRAWING

Illustrative embodiments of the present invention are described in detail below with reference to the attached drawing figures, which are incorporated by reference herein and wherein.

DETAILED DESCRIPTION

Embodiments of the present invention provide apparatus for a gas turbine transition duct that are configured geometrically to have lower operating stresses. Lower stresses, both mechanical and thermal, result in improved component life.

Figure 1:
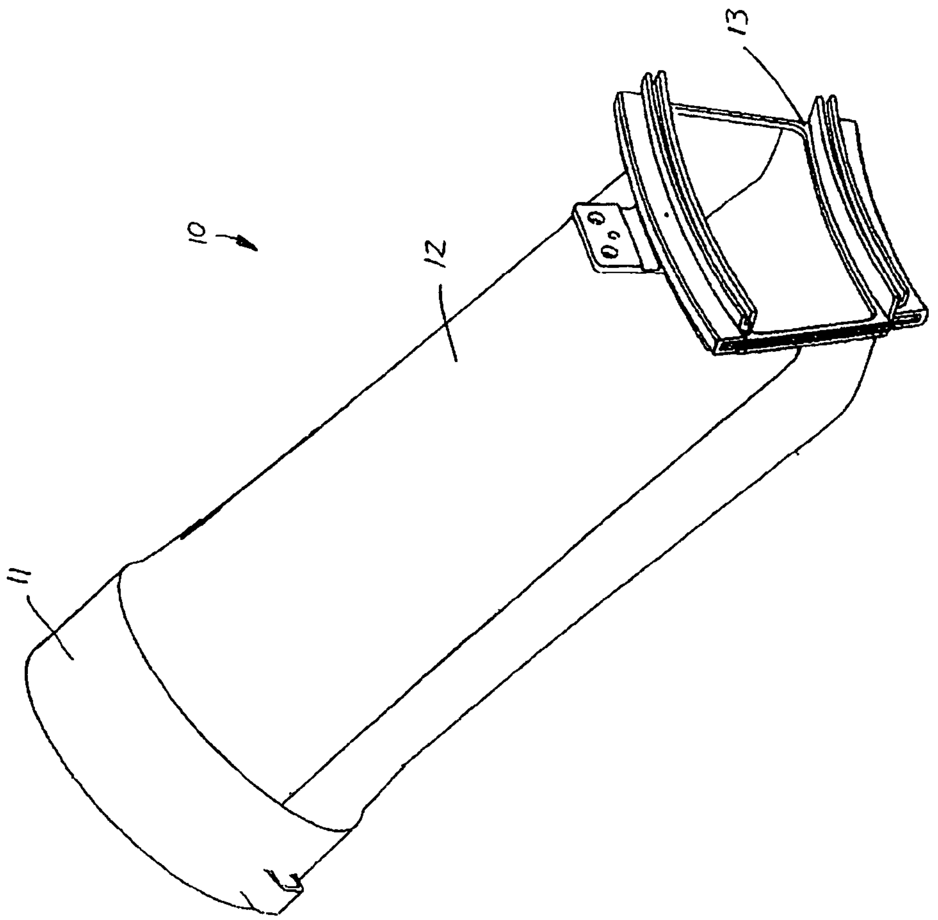
FIG. 1 PRIOR ART
FIG. 1 is a perspective view of a transition duct of the prior art.
Figure 2:
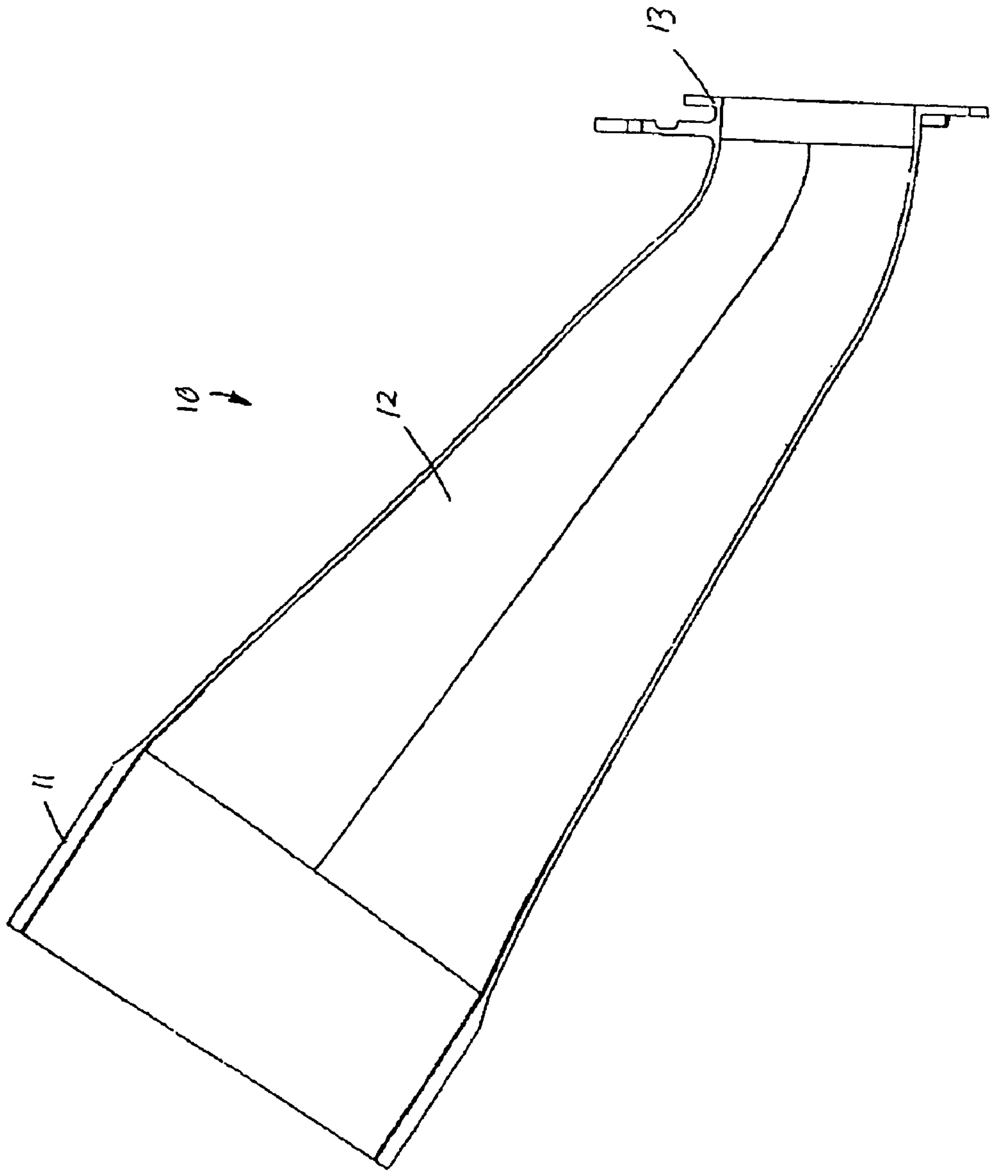
FIG. 2 PRIOR ART
FIG. 2 is a cross section view of the transition duct in FIG. 1.

Referring to FIGS. 1 and 2, a transition duct 10 of the prior art is shown. The transition duct 10 contains an inlet ring 11, a panel assembly 12, and an aft frame 13. The inlet ring 11 is of generally circular cross section while the aft frame 13 is of generally rectangular arc-like cross section where the generally rectangular are-like shape is defined by a pair of concentric arcs of different diameters connected by a pair of radial lines. The transition duct 10, which is used to transfer hot combustion gases from a combustor to a turbine, has geometric profile that must transition from a generally circular cross section to that of a generally arc-like cross section at the turbine inlet as well as to change radial positions. The geometric profile of the transition duct 10 contains a sharp transition from circular to rectangular arc-like over a short axial and radial distance thereby resulting in high stress regions throughout the aft end of the transition duct 10.

Figure 3:
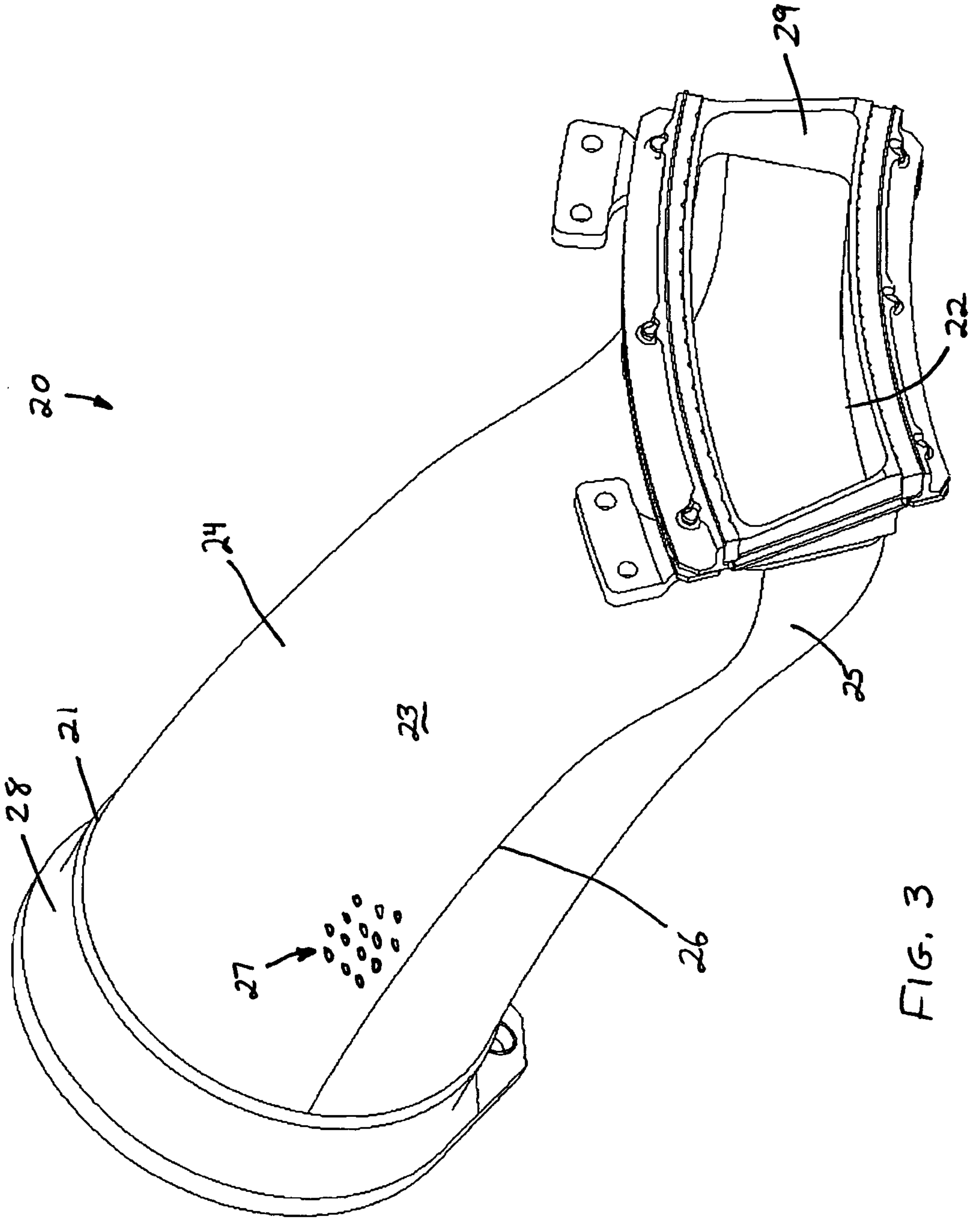
FIG. 3 is a perspective view of an embodiment of the present invention.
Figure 4:
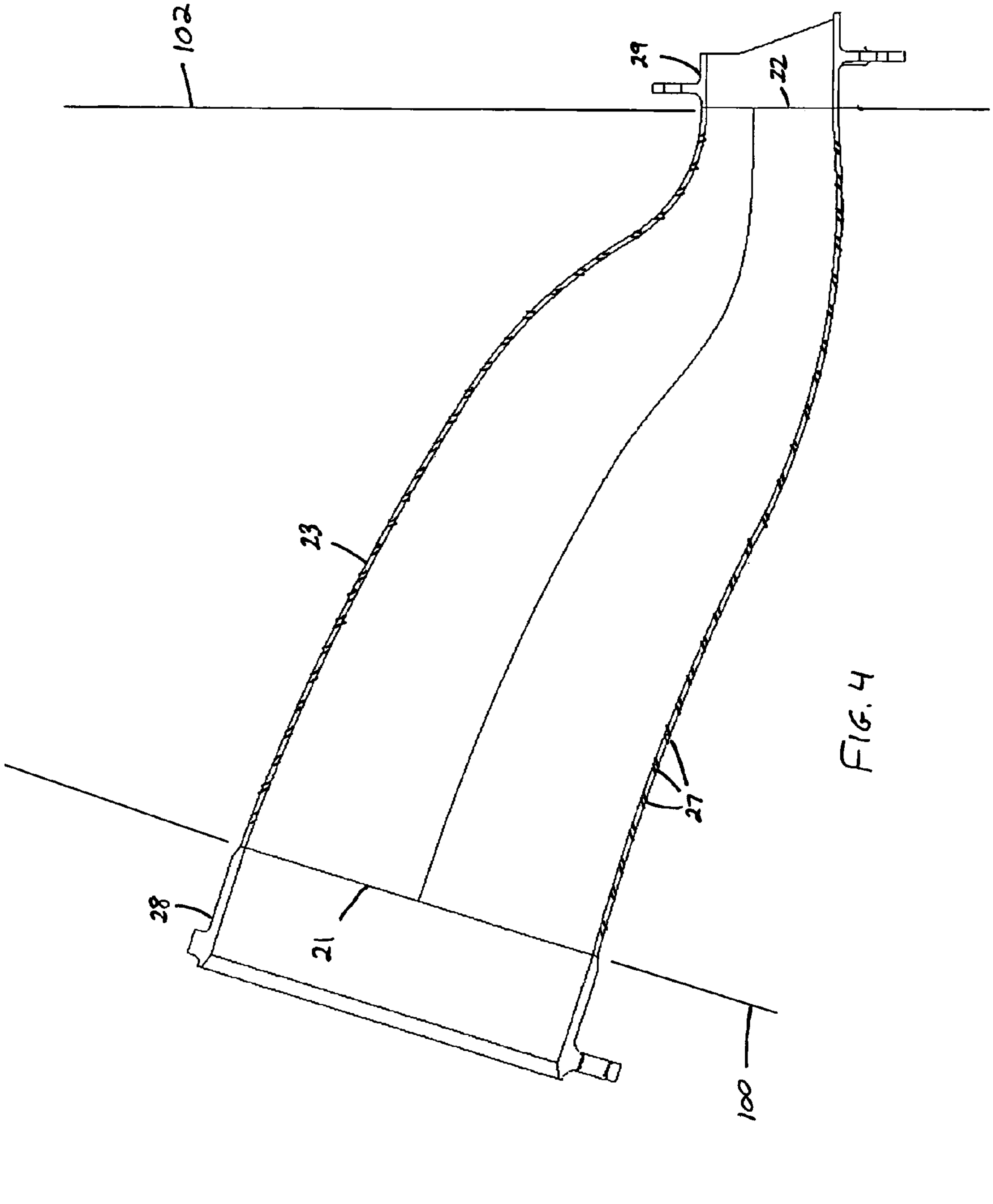
FIG. 4 is a cross section view of the embodiment of the present invention of FIG. 3.

The present invention is shown in FIGS. 3-7. Referring to FIGS. 3 and 4, a transition duct 20 includes a panel assembly 23 having an inlet end 21 of generally circular cross section and an outlet end 22 having a generally rectangular arc-like cross section. The panel assembly 23 comprises a first panel 24 and a second panel 25 joined together along a plurality of axial seams 26 by a means such as welding. In an embodiment of the present invention, the panel assembly 23 also contains a plurality of cooling holes 27 extending throughout the first panel 24 and the second panel 25 to provide cooling air to the panels. The transition duct 20 further comprises an inlet ring 28 fixed to the inlet end 21 and an aft frame 29 fixed to the outlet end 22. The panel assembly 23 of the transition duct 20 is preferably manufactured from a high temperature nickel base alloy such as Haynes 230.

Figure 5:
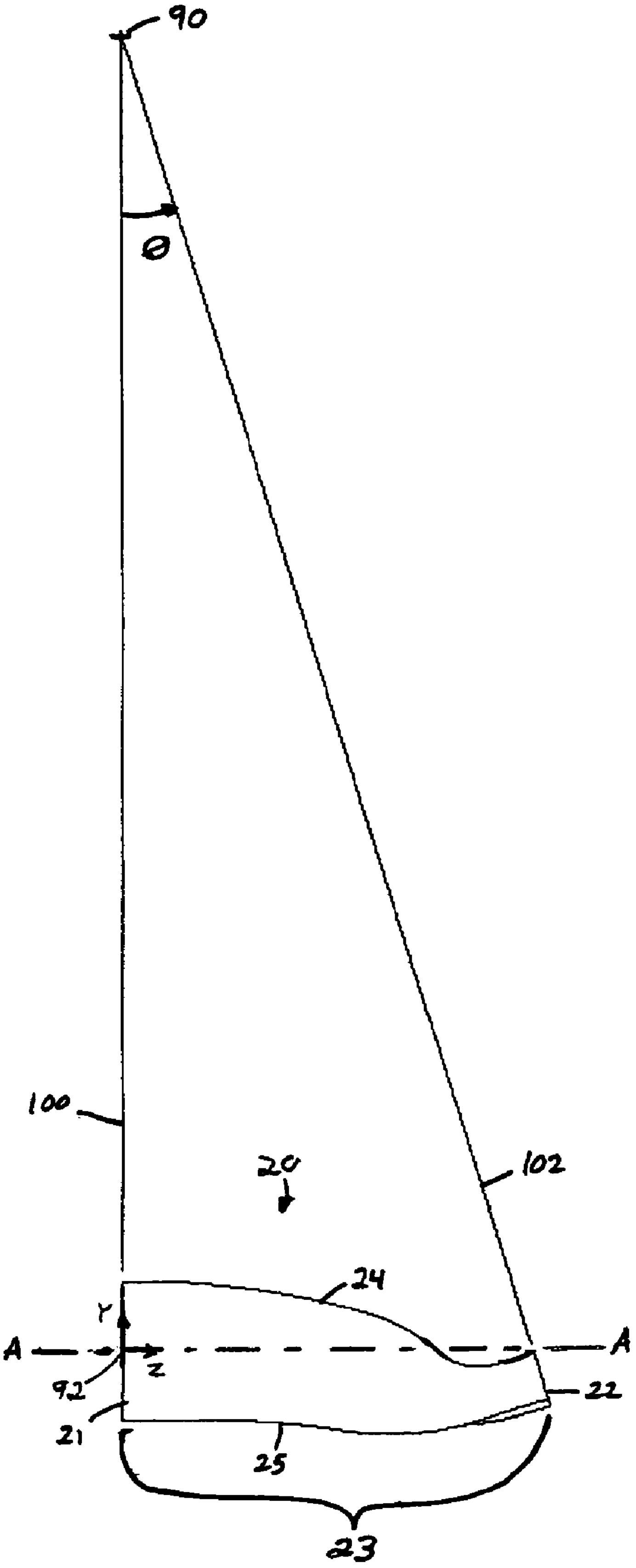
FIG. 5 is a cross section view of the preferred embodiment of the panel assembly of present invention.

The panel assembly 23, formed from the first panel 24 and the second panel 25, has an uncoated internal profile substantially in accordance with coordinate values X, Y, and Z as set forth in Table 1, carried only to three decimal places. Although the preferred unit of measure for the values given in Table 1 is inches, those skilled in the art will appreciate that the values of Table 1 for X, Y, and Z can be scaled up or down depending on the diameter of the particular combustion liner with which the present invention is to be used. This uncoated internal profile provides an optimized transition from a generally circular inlet end to a generally rectangular arc-like outlet end over the allowable axial and radial distance for a gas turbine engine, such that high steady stresses and stress concentrations in the transition duct 20 are minimized. For the purpose of describing the present invention, the coordinate values X, Y, and Z of Table 1 are taken at various sweep angles θ wherein θ is an angle measured from the inlet end 21 and increases to its maximum value at the outlet end 22. Sweep angle θ originates at an intersection line 90 formed from a first plane 100, that is defined by the inlet end 21 of the panel assembly 23, and a second plane 102, that is defined by the outlet end 22 of the panel assembly 23, as shown in FIGS. 4 and 5. An origin 92 of the Cartesian coordinate system, from which data in Table 1 is generated, is positioned at center of the inlet end 21 along an axis A-A that runs through the center of the inlet end 21, and is perpendicular to the first plane 100. The Cartesian coordinate system is oriented such that X and Y extend radially out from the origin 92, or center point of the inlet end 21, and Z extends axially along axis A-A towards the outlet end 22, as shown in FIG. 5. Coordinate values X, Y, and Z are listed in Table 1 for each sweep angle θ, measured in one-half degree increments, sufficient to define the optimized internal profile of the panel assembly 23. The data compiled in Table 1 is computer generated and though it represents the nominal uncoated internal profile, the data will vary depending on manufacturing tolerances. Therefore, it will be appreciated that a gas turbine component of this size having the panel assembly 23 fabricated primarily from formed and welded sheet metal can be expected to have manufacturing tolerances upwards of +/−0.125 inches.

Figure 6B:
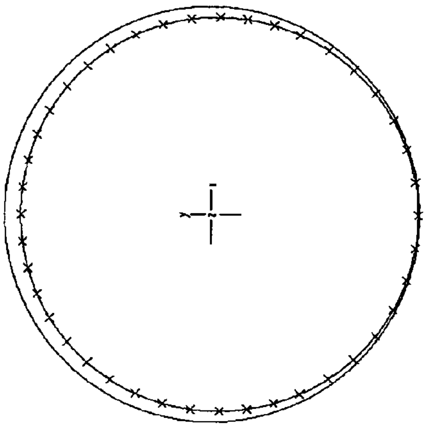
FIGS. 6*a*, 6*b*, 6*c*, and 6*d* are section views taken through the panel assembly of the present invention at various sweep angles.
Figure 6D:
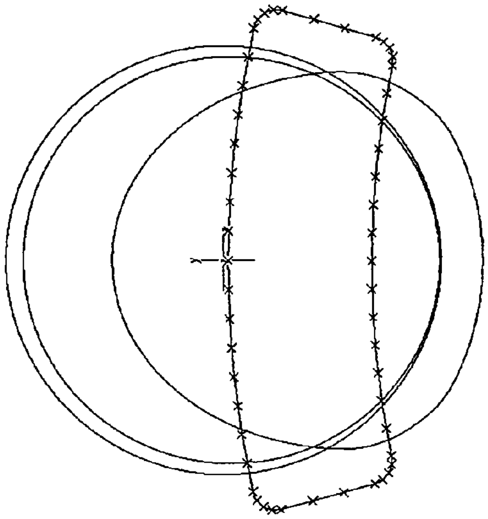
Figure 6A:
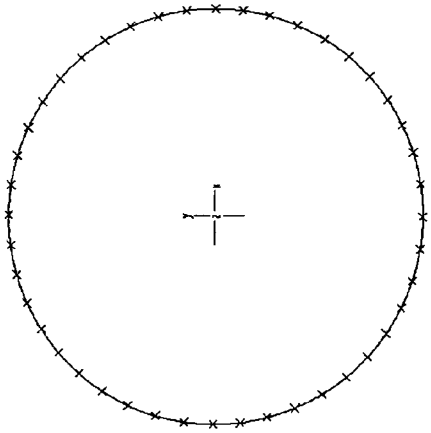
Figure 6C:
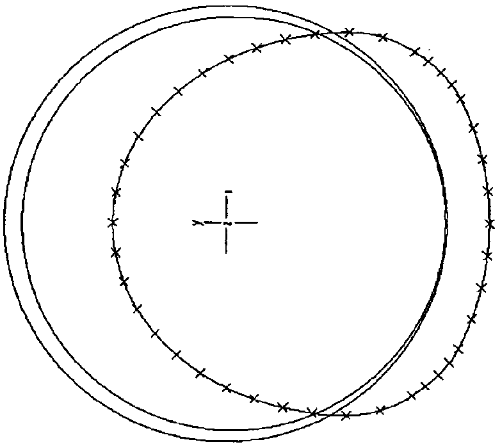
Figure 7:
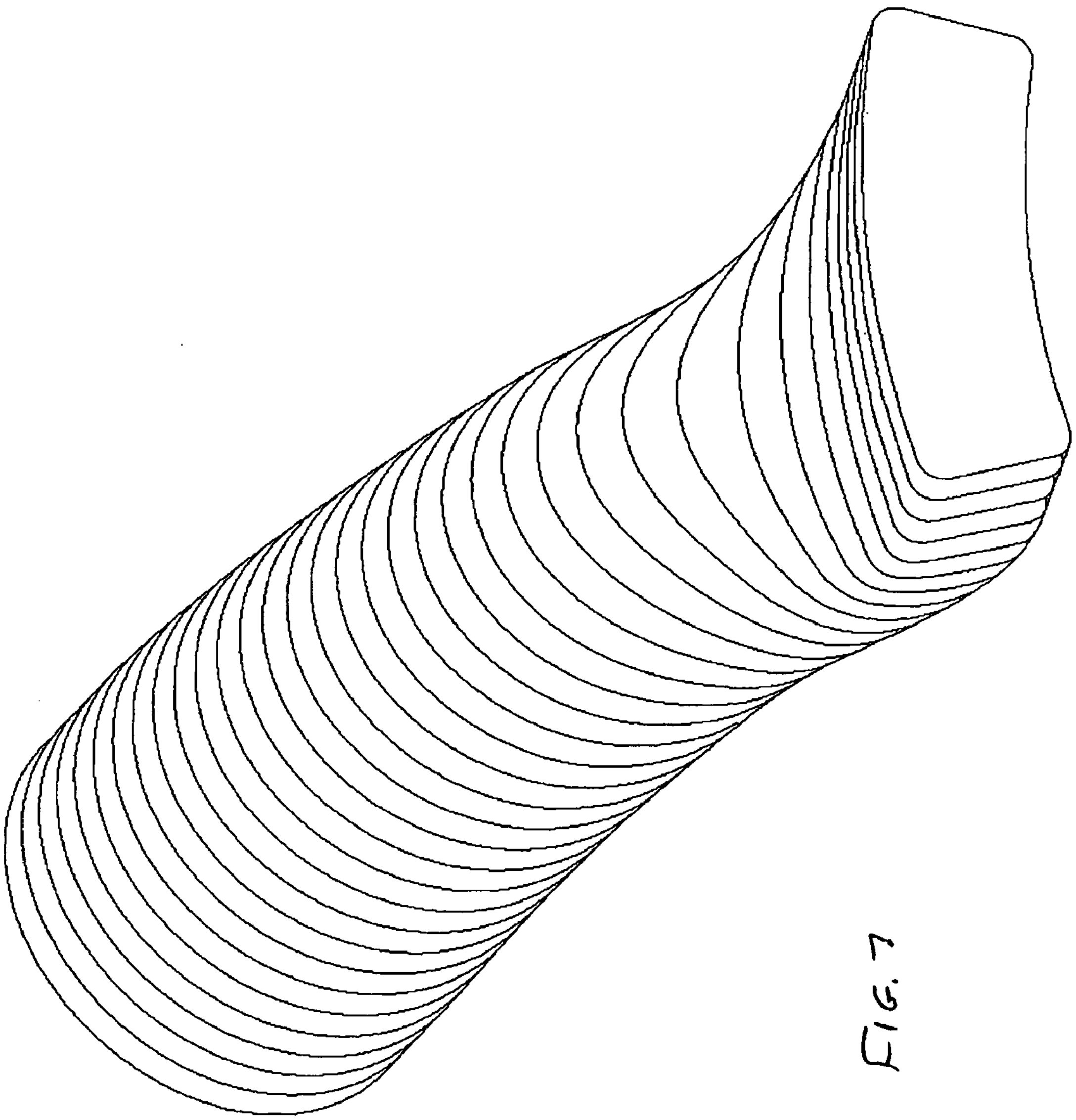
FIG. 7 is a perspective view showing each of the cross sections that define the panel assembly of the present invention.

For the data listed in Table 1 a plurality of wireframe sections can be created when applying a best-fit curve to the section data for each sweep angle θ. For example, FIGS. 6*a*-6*d* show wireframe cross sections taken at various sweep angles from the inlet end 21 to the outlet end 22 of the panel assembly 23 as well as the Cartesian coordinates (each shown as an "x" in FIGS. 6*a*-6*d*) used to define each section taken. For clarity purposes, the wireframe sections are shown progressively stacked to show the change from the previous section(s). In each of FIGS. 6*a*-6*d*, the relevant section is the one with multiple "x" markings; the other sections shown are merely for reference purposes. At the inlet end 21, a section is taken corresponding to θ=0.0 degrees and is shown in section view in FIG. 6*a*, while FIG. 6*b* shows a section taken where the sweep angle θ=5.0 degrees. In FIG. 6*c*, where a section is taken with θ=11.0 degrees, panel assembly 23 is shown transitioning from a generally circular cross section to a rectangular arc-like shape. A final section demonstrating this transition is shown in FIG. 6*d* and taken at θ=17.0 degrees, at the outlet end 22 of the panel assembly 23. It can be seen in FIGS. 6*a*-6*d* how the section geometry of the panel assembly 23 transitions from a generally circular cross section to a generally rectangular arc-like cross section. FIG. 7 shows, in perspective view, each wireframe section formed at each respective sweep angle θ, that when compiled, define the internal flowpath of the panel assembly 23.

An additional feature of the transition duct 20 is a protective two-layer coating applied along the internal profile of the panel assembly 23 to protect the transition duct 20 from deterioration associated with prolonged exposure to elevated temperatures. The two-layer air plasma sprayed coating preferably comprises a MCrAlY bond coating applied directly to the panel assembly 23 and a Yttra Stabilized Zirconia top coating applied over the bond coating, the combined coating having a thickness of at least 0.019 inches. The two-layer coating is preferably applied once the panel assembly 23 has been formed and welded in accordance with the profile as defined in Table 1.

In an alternate embodiment of the present invention there is provided a transition duct similar to that of the preferred embodiment except for the uncoated internal profile of the panel assembly 23 is within an envelope of +/−0.250 inches in a direction normal to any surface of the panel assembly substantially in accordance with the Cartesian coordinate values X, Y, and Z as set forth in Table 1. A distance of +/−0.250 inches in a direction normal to any surface of the panel assembly thereby defines a profile envelope for this specific transition duct panel assembly. This envelope ensures that all reasonable manufacturing tolerances are accommodated within the profile.

The X, Y, Z Cartesian coordinate data and corresponding sweep angles θ are summarized in the following Table 1.

TABLE 1

| Theta (deg.) | X | Y | Z |
|---|---|---|---|
| 0.0 | 0.000 | 7.226 | 0.000 |
| 0.0 | 1.046 | 7.150 | 0.000 |
| 0.0 | 2.071 | 6.926 | 0.000 |
| 0.0 | 3.054 | 6.549 | 0.000 |
| 0.0 | 3.949 | 6.052 | 0.000 |
| 0.0 | 4.764 | 5.433 | 0.000 |
| 0.0 | 5.484 | 4.705 | 0.000 |
| 0.0 | 6.094 | 3.883 | 0.000 |
| 0.0 | 6.582 | 2.982 | 0.000 |
| 0.0 | 6.937 | 2.022 | 0.000 |
| 0.0 | 7.153 | 1.021 | 0.000 |
| 0.0 | 7.226 | 0.000 | 0.000 |
| 0.0 | 7.164 | −0.943 | 0.000 |
| 0.0 | 6.980 | −1.870 | 0.000 |
| 0.0 | 6.644 | −2.840 | 0.000 |
| 0.0 | 6.175 | −3.752 | 0.000 |
| 0.0 | 5.581 | −4.589 | 0.000 |
| 0.0 | 4.875 | −5.334 | 0.000 |
| 0.0 | 4.070 | −5.970 | 0.000 |
| 0.0 | 3.184 | −6.487 | 0.000 |
| 0.0 | 2.233 | −6.872 | 0.000 |
| 0.0 | 1.130 | −7.137 | 0.000 |
| 0.0 | 0.000 | −7.226 | 0.000 |
| 0.0 | −1.130 | −7.137 | 0.000 |
| 0.0 | −2.233 | −6.872 | 0.000 |
| 0.0 | −3.184 | −6.487 | 0.000 |
| 0.0 | −4.070 | −5.970 | 0.000 |
| 0.0 | −4.875 | −5.334 | 0.000 |
| 0.0 | −5.581 | −4.589 | 0.000 |
| 0.0 | −6.175 | −3.752 | 0.000 |
| 0.0 | −6.644 | −2.840 | 0.000 |
| 0.0 | −6.980 | −1.870 | 0.000 |
| 0.0 | −7.164 | −0.943 | 0.000 |
| 0.0 | −7.226 | 0.000 | 0.000 |
| 0.0 | −7.153 | 1.021 | 0.000 |
| 0.0 | −6.937 | 2.022 | 0.000 |
| 0.0 | −6.582 | 2.982 | 0.000 |
| 0.0 | −6.094 | 3.883 | 0.000 |
| 0.0 | −5.484 | 4.705 | 0.000 |
| 0.0 | −4.764 | 5.433 | 0.000 |
| 0.0 | −3.949 | 6.052 | 0.000 |
| 0.0 | −3.054 | 6.549 | 0.000 |
| 0.0 | −2.071 | 6.926 | 0.000 |
| 0.0 | −1.046 | 7.150 | 0.000 |
| 0.5 | 0.000 | 7.226 | 1.133 |
| 0.5 | 1.046 | 7.150 | 1.134 |
| 0.5 | 2.071 | 6.926 | 1.136 |
| 0.5 | 3.054 | 6.549 | 1.139 |
| 0.5 | 3.949 | 6.052 | 1.143 |
| 0.5 | 4.764 | 5.433 | 1.149 |
| 0.5 | 5.484 | 4.705 | 1.155 |
| 0.5 | 6.094 | 3.883 | 1.162 |
| 0.5 | 6.582 | 2.982 | 1.170 |

TABLE 1-continued

| Theta (deg.) | X | Y | Z |
|---|---|---|---|
| 0.5 | 6.937 | 2.022 | 1.178 |
| 0.5 | 7.153 | 1.021 | 1.187 |
| 0.5 | 7.226 | 0.000 | 1.196 |
| 0.5 | 7.164 | −0.943 | 1.204 |
| 0.5 | 6.980 | −1.870 | 1.212 |
| 0.5 | 6.644 | −2.840 | 1.221 |
| 0.5 | 6.175 | −3.752 | 1.229 |
| 0.5 | 5.581 | −4.589 | 1.236 |
| 0.5 | 4.875 | −5.334 | 1.243 |
| 0.5 | 4.070 | −5.970 | 1.248 |
| 0.5 | 3.184 | −6.487 | 1.253 |
| 0.5 | 2.233 | −6.872 | 1.256 |
| 0.5 | 1.130 | −7.137 | 1.258 |
| 0.5 | 0.000 | −7.226 | 1.259 |
| 0.5 | −1.130 | −7.137 | 1.258 |
| 0.5 | −2.233 | −6.872 | 1.256 |
| 0.5 | −3.184 | −6.487 | 1.253 |
| 0.5 | −4.070 | −5.970 | 1.248 |
| 0.5 | −4.875 | −5.334 | 1.243 |
| 0.5 | −5.581 | −4.589 | 1.236 |
| 0.5 | −6.175 | −3.752 | 1.229 |
| 0.5 | −6.644 | −2.840 | 1.221 |
| 0.5 | −6.980 | −1.870 | 1.212 |
| 0.5 | −7.164 | −0.943 | 1.204 |
| 0.5 | −7.226 | 0.000 | 1.196 |
| 0.5 | −7.153 | 1.021 | 1.187 |
| 0.5 | −6.937 | 2.022 | 1.178 |
| 0.5 | −6.582 | 2.982 | 1.170 |
| 0.5 | −6.094 | 3.883 | 1.162 |
| 0.5 | −5.484 | 4.705 | 1.155 |
| 0.5 | −4.764 | 5.433 | 1.149 |
| 0.5 | −3.949 | 6.052 | 1.143 |
| 0.5 | −3.054 | 6.549 | 1.139 |
| 0.5 | −2.071 | 6.926 | 1.136 |
| 0.5 | −1.046 | 7.150 | 1.134 |
| 1.0 | 0.000 | 7.226 | 2.266 |
| 1.0 | 1.046 | 7.150 | 2.267 |
| 1.0 | 2.071 | 6.926 | 2.271 |
| 1.0 | 3.054 | 6.549 | 2.278 |
| 1.0 | 3.949 | 6.051 | 2.287 |
| 1.0 | 4.764 | 5.433 | 2.297 |
| 1.0 | 5.484 | 4.705 | 2.310 |
| 1.0 | 6.094 | 3.882 | 2.325 |
| 1.0 | 6.582 | 2.982 | 2.340 |
| 1.0 | 6.937 | 2.022 | 2.357 |
| 1.0 | 7.153 | 1.021 | 2.374 |
| 1.0 | 7.226 | 0.000 | 2.392 |
| 1.0 | 7.164 | −0.943 | 2.409 |
| 1.0 | 6.980 | −1.870 | 2.425 |
| 1.0 | 6.644 | −2.840 | 2.442 |
| 1.0 | 6.175 | −3.752 | 2.458 |
| 1.0 | 5.581 | −4.589 | 2.472 |
| 1.0 | 4.875 | −5.333 | 2.485 |
| 1.0 | 4.071 | −5.970 | 2.496 |
| 1.0 | 3.184 | −6.487 | 2.506 |
| 1.0 | 2.233 | −6.872 | 2.512 |
| 1.0 | 1.130 | −7.137 | 2.517 |
| 1.0 | 0.000 | −7.226 | 2.518 |
| 1.0 | −1.130 | −7.137 | 2.517 |
| 1.0 | −2.233 | −6.872 | 2.512 |
| 1.0 | −3.184 | −6.487 | 2.506 |
| 1.0 | −4.071 | −5.970 | 2.496 |
| 1.0 | −4.875 | −5.333 | 2.485 |
| 1.0 | −5.581 | −4.589 | 2.472 |
| 1.0 | −6.175 | −3.752 | 2.458 |
| 1.0 | −6.644 | −2.840 | 2.442 |
| 1.0 | −6.980 | −1.870 | 2.425 |
| 1.0 | −7.164 | −0.943 | 2.409 |
| 1.0 | −7.226 | 0.000 | 2.392 |
| 1.0 | −7.153 | 1.021 | 2.374 |
| 1.0 | −6.937 | 2.022 | 2.357 |
| 1.0 | −6.582 | 2.982 | 2.340 |
| 1.0 | −6.094 | 3.882 | 2.325 |
| 1.0 | −5.484 | 4.705 | 2.310 |
| 1.0 | −4.764 | 5.433 | 2.297 |
| 1.0 | −3.949 | 6.051 | 2.287 |
| 1.0 | −3.054 | 6.549 | 2.278 |

TABLE 1-continued

| Theta (deg.) | X | Y | Z |
|---|---|---|---|
| 1.0 | −2.071 | 6.926 | 2.271 |
| 1.0 | −1.046 | 7.150 | 2.267 |
| 1.5 | 0.000 | 7.226 | 3.400 |
| 1.5 | 1.047 | 7.149 | 3.402 |
| 1.5 | 2.073 | 6.925 | 3.408 |
| 1.5 | 3.054 | 6.549 | 3.417 |
| 1.5 | 3.949 | 6.051 | 3.430 |
| 1.5 | 4.764 | 5.432 | 3.447 |
| 1.5 | 5.485 | 4.705 | 3.466 |
| 1.5 | 6.095 | 3.882 | 3.487 |
| 1.5 | 6.582 | 2.982 | 3.511 |
| 1.5 | 6.937 | 2.022 | 3.536 |
| 1.5 | 7.153 | 1.021 | 3.562 |
| 1.5 | 7.226 | 0.000 | 3.589 |
| 1.5 | 7.164 | −0.943 | 3.614 |
| 1.5 | 6.980 | −1.870 | 3.638 |
| 1.5 | 6.644 | −2.840 | 3.663 |
| 1.5 | 6.175 | −3.752 | 3.687 |
| 1.5 | 5.582 | −4.589 | 3.709 |
| 1.5 | 4.875 | −5.333 | 3.729 |
| 1.5 | 4.071 | −5.970 | 3.745 |
| 1.5 | 3.184 | −6.487 | 3.759 |
| 1.5 | 2.233 | −6.872 | 3.769 |
| 1.5 | 1.130 | −7.137 | 3.776 |
| 1.5 | 0.000 | −7.226 | 3.778 |
| 1.5 | −1.130 | −7.137 | 3.776 |
| 1.5 | −2.233 | −6.872 | 3.769 |
| 1.5 | −3.184 | −6.487 | 3.759 |
| 1.5 | −4.071 | −5.970 | 3.745 |
| 1.5 | −4.875 | −5.333 | 3.729 |
| 1.5 | −5.582 | −4.589 | 3.709 |
| 1.5 | −6.175 | −3.752 | 3.687 |
| 1.5 | −6.644 | −2.840 | 3.663 |
| 1.5 | −6.980 | −1.870 | 3.638 |
| 1.5 | −7.164 | −0.943 | 3.614 |
| 1.5 | −7.226 | 0.000 | 3.589 |
| 1.5 | −7.153 | 1.021 | 3.562 |
| 1.5 | −6.937 | 2.022 | 3.536 |
| 1.5 | −6.582 | 2.982 | 3.511 |
| 1.5 | −6.095 | 3.882 | 3.487 |
| 1.5 | −5.485 | 4.705 | 3.466 |
| 1.5 | −4.764 | 5.432 | 3.447 |
| 1.5 | −3.949 | 6.051 | 3.430 |
| 1.5 | −3.054 | 6.549 | 3.417 |
| 1.5 | −2.073 | 6.925 | 3.408 |
| 1.5 | −1.047 | 7.149 | 3.402 |
| 2.0 | 0.000 | 7.224 | 4.534 |
| 2.0 | 1.049 | 7.148 | 4.536 |
| 2.0 | 2.077 | 6.922 | 4.544 |
| 2.0 | 3.058 | 6.545 | 4.557 |
| 2.0 | 3.951 | 6.047 | 4.575 |
| 2.0 | 4.765 | 5.428 | 4.596 |
| 2.0 | 5.483 | 4.700 | 4.622 |
| 2.0 | 6.091 | 3.878 | 4.651 |
| 2.0 | 6.576 | 2.978 | 4.682 |
| 2.0 | 6.929 | 2.019 | 4.716 |
| 2.0 | 7.142 | 1.019 | 4.750 |
| 2.0 | 7.212 | −0.001 | 4.786 |
| 2.0 | 7.143 | −0.970 | 4.820 |
| 2.0 | 6.944 | −1.921 | 4.853 |
| 2.0 | 6.604 | −2.879 | 4.887 |
| 2.0 | 6.134 | −3.779 | 4.918 |
| 2.0 | 5.541 | −4.605 | 4.947 |
| 2.0 | 4.839 | −5.339 | 4.972 |
| 2.0 | 4.040 | −5.966 | 4.994 |
| 2.0 | 3.160 | −6.475 | 5.012 |
| 2.0 | 2.217 | −6.854 | 5.025 |
| 2.0 | 1.122 | −7.112 | 5.034 |
| 2.0 | 0.000 | −7.199 | 5.037 |
| 2.0 | −1.122 | −7.112 | 5.034 |
| 2.0 | −2.217 | −6.854 | 5.025 |
| 2.0 | −3.160 | −6.475 | 5.012 |
| 2.0 | −4.040 | −5.966 | 4.994 |
| 2.0 | −4.839 | −5.339 | 4.972 |
| 2.0 | −5.541 | −4.605 | 4.947 |
| 2.0 | −6.134 | −3.779 | 4.918 |
| 2.0 | −6.604 | −2.879 | 4.887 |

TABLE 1-continued

| Theta (deg.) | X | Y | Z |
|---|---|---|---|
| 2.0 | −6.944 | −1.921 | 4.853 |
| 2.0 | −7.143 | −0.970 | 4.820 |
| 2.0 | −7.212 | −0.001 | 4.786 |
| 2.0 | −7.142 | 1.019 | 4.750 |
| 2.0 | −6.929 | 2.019 | 4.716 |
| 2.0 | −6.576 | 2.978 | 4.682 |
| 2.0 | −6.091 | 3.878 | 4.651 |
| 2.0 | −5.483 | 4.700 | 4.622 |
| 2.0 | −4.765 | 5.428 | 4.596 |
| 2.0 | −3.951 | 6.047 | 4.575 |
| 2.0 | −3.058 | 6.545 | 4.557 |
| 2.0 | −2.077 | 6.922 | 4.544 |
| 2.0 | −1.049 | 7.148 | 4.536 |
| 2.5 | 0.000 | 7.166 | 5.671 |
| 2.5 | 1.081 | 7.085 | 5.675 |
| 2.5 | 2.138 | 6.847 | 5.685 |
| 2.5 | 3.145 | 6.446 | 5.702 |
| 2.5 | 4.013 | 5.946 | 5.724 |
| 2.5 | 4.802 | 5.329 | 5.751 |
| 2.5 | 5.497 | 4.608 | 5.783 |
| 2.5 | 6.084 | 3.796 | 5.818 |
| 2.5 | 6.550 | 2.910 | 5.857 |
| 2.5 | 6.889 | 1.967 | 5.898 |
| 2.5 | 7.090 | 0.987 | 5.941 |
| 2.5 | 7.153 | −0.013 | 5.984 |
| 2.5 | 7.064 | −1.069 | 6.031 |
| 2.5 | 6.822 | −2.102 | 6.076 |
| 2.5 | 6.472 | −3.019 | 6.116 |
| 2.5 | 6.002 | −3.880 | 6.153 |
| 2.5 | 5.419 | −4.669 | 6.188 |
| 2.5 | 4.733 | −5.371 | 6.218 |
| 2.5 | 3.956 | −5.970 | 6.245 |
| 2.5 | 3.103 | −6.456 | 6.266 |
| 2.5 | 2.190 | −6.817 | 6.281 |
| 2.5 | 1.108 | −7.065 | 6.292 |
| 2.5 | 0.000 | −7.150 | 6.296 |
| 2.5 | −1.108 | −7.065 | 6.292 |
| 2.5 | −2.190 | −6.817 | 6.281 |
| 2.5 | −3.103 | −6.456 | 6.266 |
| 2.5 | −3.956 | −5.970 | 6.245 |
| 2.5 | −4.733 | −5.371 | 6.218 |
| 2.5 | −5.419 | −4.669 | 6.188 |
| 2.5 | −6.002 | −3.880 | 6.153 |
| 2.5 | −6.472 | −3.019 | 6.116 |
| 2.5 | −6.822 | −2.102 | 6.076 |
| 2.5 | −7.064 | −1.069 | 6.031 |
| 2.5 | −7.153 | −0.013 | 5.984 |
| 2.5 | −7.090 | 0.987 | 5.941 |
| 2.5 | −6.889 | 1.967 | 5.898 |
| 2.5 | −6.550 | 2.910 | 5.857 |
| 2.5 | −6.084 | 3.796 | 5.818 |
| 2.5 | −5.497 | 4.608 | 5.783 |
| 2.5 | −4.802 | 5.329 | 5.751 |
| 2.5 | −4.013 | 5.946 | 5.724 |
| 2.5 | −3.145 | 6.446 | 5.702 |
| 2.5 | −2.138 | 6.847 | 5.685 |
| 2.5 | −1.081 | 7.085 | 5.675 |
| 3.0 | 0.000 | 7.093 | 6.811 |
| 3.0 | 1.113 | 7.007 | 6.815 |
| 3.0 | 2.201 | 6.754 | 6.829 |
| 3.0 | 3.233 | 6.328 | 6.851 |
| 3.0 | 4.075 | 5.825 | 6.877 |
| 3.0 | 4.838 | 5.210 | 6.910 |
| 3.0 | 5.509 | 4.495 | 6.947 |
| 3.0 | 6.074 | 3.694 | 6.989 |
| 3.0 | 6.522 | 2.823 | 7.035 |
| 3.0 | 6.845 | 1.898 | 7.083 |
| 3.0 | 7.037 | 0.937 | 7.134 |
| 3.0 | 7.094 | −0.041 | 7.185 |
| 3.0 | 6.988 | −1.180 | 7.245 |
| 3.0 | 6.701 | −2.289 | 7.303 |
| 3.0 | 6.343 | −3.164 | 7.348 |
| 3.0 | 5.876 | −3.985 | 7.392 |
| 3.0 | 5.303 | −4.738 | 7.431 |
| 3.0 | 4.635 | −5.407 | 7.466 |
| 3.0 | 3.882 | −5.980 | 7.496 |
| 3.0 | 3.058 | −6.445 | 7.520 |

TABLE 1-continued

| Theta (deg.) | X | Y | Z |
|---|---|---|---|
| 3.0 | 2.177 | −6.790 | 7.539 |
| 3.0 | 1.101 | −7.036 | 7.551 |
| 3.0 | 0.000 | −7.119 | 7.556 |
| 3.0 | −1.101 | −7.036 | 7.551 |
| 3.0 | −2.177 | −6.790 | 7.539 |
| 3.0 | −3.058 | −6.445 | 7.520 |
| 3.0 | −3.882 | −5.980 | 7.496 |
| 3.0 | −4.635 | −5.407 | 7.466 |
| 3.0 | −5.303 | −4.738 | 7.431 |
| 3.0 | −5.876 | −3.985 | 7.392 |
| 3.0 | −6.343 | −3.164 | 7.348 |
| 3.0 | −6.701 | −2.289 | 7.303 |
| 3.0 | −6.988 | −1.180 | 7.245 |
| 3.0 | −7.094 | −0.041 | 7.185 |
| 3.0 | −7.037 | 0.937 | 7.134 |
| 3.0 | −6.845 | 1.898 | 7.083 |
| 3.0 | −6.522 | 2.823 | 7.035 |
| 3.0 | −6.074 | 3.694 | 6.989 |
| 3.0 | −5.509 | 4.495 | 6.947 |
| 3.0 | −4.838 | 5.210 | 6.910 |
| 3.0 | −4.075 | 5.825 | 6.877 |
| 3.0 | −3.233 | 6.328 | 6.851 |
| 3.0 | −2.201 | 6.754 | 6.829 |
| 3.0 | −1.113 | 7.007 | 6.815 |
| 3.5 | 0.000 | 7.007 | 7.954 |
| 3.5 | 1.147 | 6.915 | 7.960 |
| 3.5 | 2.266 | 6.644 | 7.976 |
| 3.5 | 3.323 | 6.189 | 8.004 |
| 3.5 | 4.137 | 5.683 | 8.035 |
| 3.5 | 4.874 | 5.070 | 8.072 |
| 3.5 | 5.519 | 4.362 | 8.116 |
| 3.5 | 6.061 | 3.573 | 8.164 |
| 3.5 | 6.490 | 2.717 | 8.216 |
| 3.5 | 6.799 | 1.811 | 8.272 |
| 3.5 | 6.981 | 0.871 | 8.329 |
| 3.5 | 7.034 | −0.085 | 8.388 |
| 3.5 | 6.914 | −1.302 | 8.462 |
| 3.5 | 6.583 | −2.481 | 8.534 |
| 3.5 | 6.149 | −3.448 | 8.593 |
| 3.5 | 5.579 | −4.342 | 8.648 |
| 3.5 | 4.882 | −5.141 | 8.697 |
| 3.5 | 4.070 | −5.824 | 8.739 |
| 3.5 | 3.163 | −6.375 | 8.772 |
| 3.5 | 2.180 | −6.775 | 8.797 |
| 3.5 | 1.102 | −7.023 | 8.812 |
| 3.5 | 0.000 | −7.107 | 8.817 |
| 3.5 | −1.102 | −7.023 | 8.812 |
| 3.5 | −2.180 | −6.775 | 8.797 |
| 3.5 | −3.163 | −6.375 | 8.772 |
| 3.5 | −4.070 | −5.824 | 8.739 |
| 3.5 | −4.882 | −5.141 | 8.697 |
| 3.5 | −5.579 | −4.342 | 8.648 |
| 3.5 | −6.149 | −3.448 | 8.593 |
| 3.5 | −6.583 | −2.481 | 8.534 |
| 3.5 | −6.914 | −1.302 | 8.462 |
| 3.5 | −7.034 | −0.085 | 8.388 |
| 3.5 | −6.981 | 0.871 | 8.329 |
| 3.5 | −6.799 | 1.811 | 8.272 |
| 3.5 | −6.490 | 2.717 | 8.216 |
| 3.5 | −6.061 | 3.573 | 8.164 |
| 3.5 | −5.519 | 4.362 | 8.116 |
| 3.5 | −4.874 | 5.070 | 8.072 |
| 3.5 | −4.137 | 5.683 | 8.035 |
| 3.5 | −3.323 | 6.189 | 8.004 |
| 3.5 | −2.266 | 6.644 | 7.976 |
| 3.5 | −1.147 | 6.915 | 7.960 |
| 4.0 | 0.000 | 6.906 | 9.101 |
| 4.0 | 0.889 | 6.851 | 9.105 |
| 4.0 | 1.764 | 6.685 | 9.116 |
| 4.0 | 2.612 | 6.412 | 9.135 |
| 4.0 | 3.416 | 6.029 | 9.162 |
| 4.0 | 4.307 | 5.438 | 9.203 |
| 4.0 | 5.095 | 4.717 | 9.254 |
| 4.0 | 5.763 | 3.884 | 9.312 |
| 4.0 | 6.295 | 2.958 | 9.377 |
| 4.0 | 6.679 | 1.962 | 9.446 |
| 4.0 | 6.906 | 0.920 | 9.519 |

TABLE 1-continued

| Theta (deg.) | X | Y | Z |
|---|---|---|---|
| 4.0 | 6.974 | −0.145 | 9.594 |
| 4.0 | 6.911 | −1.008 | 9.654 |
| 4.0 | 6.741 | −1.857 | 9.714 |
| 4.0 | 6.467 | −2.679 | 9.771 |
| 4.0 | 6.030 | −3.597 | 9.835 |
| 4.0 | 5.469 | −4.445 | 9.895 |
| 4.0 | 4.792 | −5.204 | 9.948 |
| 4.0 | 4.009 | −5.855 | 9.993 |
| 4.0 | 3.138 | −6.383 | 10.030 |
| 4.0 | 2.197 | −6.771 | 10.057 |
| 4.0 | 1.112 | −7.027 | 10.075 |
| 4.0 | 0.000 | −7.114 | 10.081 |
| 4.0 | −1.112 | −7.027 | 10.075 |
| 4.0 | −2.197 | −6.771 | 10.057 |
| 4.0 | −3.138 | −6.383 | 10.030 |
| 4.0 | −4.009 | −5.855 | 9.993 |
| 4.0 | −4.792 | −5.204 | 9.948 |
| 4.0 | −5.469 | −4.445 | 9.895 |
| 4.0 | −6.030 | −3.597 | 9.835 |
| 4.0 | −6.467 | −2.679 | 9.771 |
| 4.0 | −6.741 | −1.857 | 9.714 |
| 4.0 | −6.911 | −1.008 | 9.654 |
| 4.0 | −6.974 | −0.145 | 9.594 |
| 4.0 | −6.906 | 0.920 | 9.519 |
| 4.0 | −6.679 | 1.962 | 9.446 |
| 4.0 | −6.295 | 2.958 | 9.377 |
| 4.0 | −5.763 | 3.884 | 9.312 |
| 4.0 | −5.095 | 4.717 | 9.254 |
| 4.0 | −4.307 | 5.438 | 9.203 |
| 4.0 | −3.416 | 6.029 | 9.162 |
| 4.0 | −2.612 | 6.412 | 9.135 |
| 4.0 | −1.764 | 6.685 | 9.116 |
| 4.0 | −0.889 | 6.851 | 9.105 |
| 4.5 | 0.000 | 6.791 | 10.252 |
| 4.5 | 0.917 | 6.731 | 10.257 |
| 4.5 | 1.819 | 6.552 | 10.271 |
| 4.5 | 2.689 | 6.258 | 10.294 |
| 4.5 | 3.510 | 5.846 | 10.326 |
| 4.5 | 4.366 | 5.253 | 10.373 |
| 4.5 | 5.122 | 4.536 | 10.429 |
| 4.5 | 5.760 | 3.714 | 10.494 |
| 4.5 | 6.267 | 2.806 | 10.565 |
| 4.5 | 6.632 | 1.832 | 10.642 |
| 4.5 | 6.848 | 0.816 | 10.722 |
| 4.5 | 6.913 | −0.222 | 10.804 |
| 4.5 | 6.845 | −1.131 | 10.875 |
| 4.5 | 6.657 | −2.023 | 10.946 |
| 4.5 | 6.353 | −2.883 | 11.013 |
| 4.5 | 5.917 | −3.752 | 11.082 |
| 4.5 | 5.367 | −4.555 | 11.145 |
| 4.5 | 4.711 | −5.274 | 11.201 |
| 4.5 | 3.959 | −5.893 | 11.250 |
| 4.5 | 3.126 | −6.399 | 11.290 |
| 4.5 | 2.228 | −6.777 | 11.320 |
| 4.5 | 1.129 | −7.048 | 11.341 |
| 4.5 | 0.000 | −7.140 | 11.348 |
| 4.5 | −1.129 | −7.048 | 11.341 |
| 4.5 | −2.228 | −6.777 | 11.320 |
| 4.5 | −3.126 | −6.399 | 11.290 |
| 4.5 | −3.959 | −5.893 | 11.250 |
| 4.5 | −4.711 | −5.274 | 11.201 |
| 4.5 | −5.367 | −4.555 | 11.145 |
| 4.5 | −5.917 | −3.752 | 11.082 |
| 4.5 | −6.353 | −2.883 | 11.013 |
| 4.5 | −6.657 | −2.023 | 10.946 |
| 4.5 | −6.845 | −1.131 | 10.875 |
| 4.5 | −6.913 | −0.222 | 10.804 |
| 4.5 | −6.848 | 0.816 | 10.722 |
| 4.5 | −6.632 | 1.832 | 10.642 |
| 4.5 | −6.267 | 2.806 | 10.565 |
| 4.5 | −5.760 | 3.714 | 10.494 |
| 4.5 | −5.122 | 4.536 | 10.429 |
| 4.5 | −4.366 | 5.253 | 10.373 |
| 4.5 | −3.510 | 5.846 | 10.326 |
| 4.5 | −2.689 | 6.258 | 10.294 |
| 4.5 | −1.819 | 6.552 | 10.271 |
| 4.5 | −0.917 | 6.731 | 10.257 |

TABLE 1-continued

| Theta (deg.) | X | Y | Z |
|---|---|---|---|
| 5.0 | 0.000 | 6.660 | 11.408 |
| 5.0 | 0.947 | 6.595 | 11.414 |
| 5.0 | 1.876 | 6.401 | 11.431 |
| 5.0 | 2.769 | 6.084 | 11.458 |
| 5.0 | 3.608 | 5.641 | 11.497 |
| 5.0 | 4.427 | 5.044 | 11.549 |
| 5.0 | 5.148 | 4.333 | 11.611 |
| 5.0 | 5.756 | 3.524 | 11.682 |
| 5.0 | 6.238 | 2.634 | 11.760 |
| 5.0 | 6.584 | 1.684 | 11.843 |
| 5.0 | 6.789 | 0.694 | 11.930 |
| 5.0 | 6.851 | −0.316 | 12.018 |
| 5.0 | 6.778 | −1.267 | 12.101 |
| 5.0 | 6.573 | −2.198 | 12.183 |
| 5.0 | 6.242 | −3.093 | 12.261 |
| 5.0 | 5.711 | −4.072 | 12.347 |
| 5.0 | 5.031 | −4.954 | 12.424 |
| 5.0 | 4.219 | −5.717 | 12.491 |
| 5.0 | 3.292 | −6.337 | 12.545 |
| 5.0 | 2.275 | −6.795 | 12.585 |
| 5.0 | 1.154 | −7.086 | 12.611 |
| 5.0 | 0.000 | −7.185 | 12.619 |
| 5.0 | −1.154 | −7.086 | 12.611 |
| 5.0 | −2.275 | −6.795 | 12.585 |
| 5.0 | −3.292 | −6.337 | 12.545 |
| 5.0 | −4.219 | −5.717 | 12.491 |
| 5.0 | −5.031 | −4.954 | 12.424 |
| 5.0 | −5.711 | −4.072 | 12.347 |
| 5.0 | −6.242 | −3.093 | 12.261 |
| 5.0 | −6.573 | −2.198 | 12.183 |
| 5.0 | −6.778 | −1.267 | 12.101 |
| 5.0 | −6.851 | −0.316 | 12.018 |
| 5.0 | −6.789 | 0.694 | 11.930 |
| 5.0 | −6.584 | 1.684 | 11.843 |
| 5.0 | −6.238 | 2.634 | 11.760 |
| 5.0 | −5.756 | 3.524 | 11.682 |
| 5.0 | −5.148 | 4.333 | 11.611 |
| 5.0 | −4.427 | 5.044 | 11.549 |
| 5.0 | −3.608 | 5.641 | 11.497 |
| 5.0 | −2.769 | 6.084 | 11.458 |
| 5.0 | −1.876 | 6.401 | 11.431 |
| 5.0 | −0.947 | 6.595 | 11.414 |
| 5.5 | 0.000 | 6.515 | 12.569 |
| 5.5 | 0.978 | 6.444 | 12.576 |
| 5.5 | 1.935 | 6.233 | 12.597 |
| 5.5 | 2.853 | 5.890 | 12.630 |
| 5.5 | 3.707 | 5.412 | 12.676 |
| 5.5 | 4.489 | 4.813 | 12.733 |
| 5.5 | 5.175 | 4.108 | 12.801 |
| 5.5 | 5.751 | 3.312 | 12.878 |
| 5.5 | 6.207 | 2.441 | 12.962 |
| 5.5 | 6.536 | 1.516 | 13.051 |
| 5.5 | 6.730 | 0.553 | 13.143 |
| 5.5 | 6.789 | −0.426 | 13.238 |
| 5.5 | 6.709 | −1.415 | 13.333 |
| 5.5 | 6.488 | −2.383 | 13.426 |
| 5.5 | 6.132 | −3.310 | 13.515 |
| 5.5 | 5.612 | −4.232 | 13.604 |
| 5.5 | 4.956 | −5.063 | 13.684 |
| 5.5 | 4.179 | −5.785 | 13.754 |
| 5.5 | 3.299 | −6.376 | 13.811 |
| 5.5 | 2.337 | −6.824 | 13.854 |
| 5.5 | 1.188 | −7.141 | 13.884 |
| 5.5 | 0.000 | −7.249 | 13.895 |
| 5.5 | −1.188 | −7.141 | 13.884 |
| 5.5 | −2.337 | −6.824 | 13.854 |
| 5.5 | −3.299 | −6.376 | 13.811 |
| 5.5 | −4.179 | −5.785 | 13.754 |
| 5.5 | −4.956 | −5.063 | 13.684 |
| 5.5 | −5.612 | −4.232 | 13.604 |
| 5.5 | −6.132 | −3.310 | 13.515 |
| 5.5 | −6.488 | −2.383 | 13.426 |
| 5.5 | −6.709 | −1.415 | 13.333 |
| 5.5 | −6.789 | −0.426 | 13.238 |
| 5.5 | −6.730 | 0.553 | 13.143 |
| 5.5 | −6.536 | 1.516 | 13.051 |
| 5.5 | −6.207 | 2.441 | 12.962 |

TABLE 1-continued

| Theta (deg.) | X | Y | Z |
|---|---|---|---|
| 5.5 | −5.751 | 3.312 | 12.878 |
| 5.5 | −5.175 | 4.108 | 12.801 |
| 5.5 | −4.489 | 4.813 | 12.733 |
| 5.5 | −3.707 | 5.412 | 12.676 |
| 5.5 | −2.853 | 5.890 | 12.630 |
| 5.5 | −1.935 | 6.233 | 12.597 |
| 5.5 | −0.978 | 6.444 | 12.576 |
| 6.0 | 0.000 | 6.353 | 13.737 |
| 6.0 | 1.011 | 6.276 | 13.745 |
| 6.0 | 1.998 | 6.048 | 13.769 |
| 6.0 | 2.939 | 5.674 | 13.808 |
| 6.0 | 3.810 | 5.158 | 13.863 |
| 6.0 | 4.552 | 4.558 | 13.926 |
| 6.0 | 5.201 | 3.860 | 13.999 |
| 6.0 | 5.746 | 3.078 | 14.081 |
| 6.0 | 6.177 | 2.229 | 14.171 |
| 6.0 | 6.487 | 1.329 | 14.265 |
| 6.0 | 6.670 | 0.395 | 14.363 |
| 6.0 | 6.725 | −0.555 | 14.463 |
| 6.0 | 6.637 | −1.578 | 14.571 |
| 6.0 | 6.402 | −2.577 | 14.676 |
| 6.0 | 6.025 | −3.533 | 14.776 |
| 6.0 | 5.521 | −4.400 | 14.867 |
| 6.0 | 4.891 | −5.182 | 14.950 |
| 6.0 | 4.152 | −5.862 | 15.021 |
| 6.0 | 3.320 | −6.426 | 15.080 |
| 6.0 | 2.414 | −6.864 | 15.126 |
| 6.0 | 1.230 | −7.214 | 15.163 |
| 6.0 | 0.000 | −7.332 | 15.176 |
| 6.0 | −1.230 | −7.214 | 15.163 |
| 6.0 | −2.414 | −6.864 | 15.126 |
| 6.0 | −3.320 | −6.426 | 15.080 |
| 6.0 | −4.152 | −5.862 | 15.021 |
| 6.0 | −4.891 | −5.182 | 14.950 |
| 6.0 | −5.521 | −4.400 | 14.867 |
| 6.0 | −6.025 | −3.533 | 14.776 |
| 6.0 | −6.402 | −2.577 | 14.676 |
| 6.0 | −6.637 | −1.578 | 14.571 |
| 6.0 | −6.725 | −0.555 | 14.463 |
| 6.0 | −6.670 | 0.395 | 14.363 |
| 6.0 | −6.487 | 1.329 | 14.265 |
| 6.0 | −6.177 | 2.229 | 14.171 |
| 6.0 | −5.746 | 3.078 | 14.081 |
| 6.0 | −5.201 | 3.860 | 13.999 |
| 6.0 | −4.552 | 4.558 | 13.926 |
| 6.0 | −3.810 | 5.158 | 13.863 |
| 6.0 | −2.939 | 5.674 | 13.808 |
| 6.0 | −1.998 | 6.048 | 13.769 |
| 6.0 | −1.011 | 6.276 | 13.745 |
| 6.5 | 0.000 | 6.176 | 14.912 |
| 6.5 | 1.045 | 6.092 | 14.921 |
| 6.5 | 2.064 | 5.843 | 14.950 |
| 6.5 | 3.030 | 5.438 | 14.996 |
| 6.5 | 3.915 | 4.879 | 15.059 |
| 6.5 | 4.725 | 4.169 | 15.140 |
| 6.5 | 5.411 | 3.341 | 15.235 |
| 6.5 | 5.958 | 2.415 | 15.340 |
| 6.5 | 6.354 | 1.417 | 15.454 |
| 6.5 | 6.590 | 0.370 | 15.573 |
| 6.5 | 6.661 | −0.701 | 15.695 |
| 6.5 | 6.564 | −1.753 | 15.815 |
| 6.5 | 6.314 | −2.781 | 15.932 |
| 6.5 | 5.920 | −3.763 | 16.044 |
| 6.5 | 5.435 | −4.576 | 16.137 |
| 6.5 | 4.836 | −5.309 | 16.220 |
| 6.5 | 4.137 | −5.950 | 16.293 |
| 6.5 | 3.354 | −6.487 | 16.354 |
| 6.5 | 2.507 | −6.916 | 16.403 |
| 6.5 | 1.698 | −7.203 | 16.436 |
| 6.5 | 0.857 | −7.376 | 16.456 |
| 6.5 | 0.000 | −7.436 | 16.462 |
| 6.5 | −0.857 | −7.376 | 16.456 |
| 6.5 | −1.698 | −7.203 | 16.436 |
| 6.5 | −2.507 | −6.916 | 16.403 |
| 6.5 | −3.354 | −6.487 | 16.354 |
| 6.5 | −4.137 | −5.950 | 16.293 |
| 6.5 | −4.836 | −5.309 | 16.220 |

TABLE 1-continued

| Theta (deg.) | X | Y | Z |
|---|---|---|---|
| 6.5 | −5.435 | −4.576 | 16.137 |
| 6.5 | −5.920 | −3.763 | 16.044 |
| 6.5 | −6.314 | −2.781 | 15.932 |
| 6.5 | −6.564 | −1.753 | 15.815 |
| 6.5 | −6.661 | −0.701 | 15.695 |
| 6.5 | −6.590 | 0.370 | 15.573 |
| 6.5 | −6.354 | 1.417 | 15.454 |
| 6.5 | −5.958 | 2.415 | 15.340 |
| 6.5 | −5.411 | 3.341 | 15.235 |
| 6.5 | −4.725 | 4.169 | 15.140 |
| 6.5 | −3.915 | 4.879 | 15.059 |
| 6.5 | −3.030 | 5.438 | 14.996 |
| 6.5 | −2.064 | 5.843 | 14.950 |
| 6.5 | −1.045 | 6.092 | 14.921 |
| 7.0 | 0.000 | 5.983 | 16.093 |
| 7.0 | 1.082 | 5.891 | 16.105 |
| 7.0 | 2.133 | 5.620 | 16.138 |
| 7.0 | 3.124 | 5.178 | 16.192 |
| 7.0 | 4.023 | 4.573 | 16.267 |
| 7.0 | 4.784 | 3.864 | 16.354 |
| 7.0 | 5.428 | 3.050 | 16.454 |
| 7.0 | 5.940 | 2.148 | 16.564 |
| 7.0 | 6.311 | 1.180 | 16.683 |
| 7.0 | 6.531 | 0.168 | 16.807 |
| 7.0 | 6.596 | −0.866 | 16.934 |
| 7.0 | 6.489 | −1.944 | 17.067 |
| 7.0 | 6.226 | −2.995 | 17.196 |
| 7.0 | 5.817 | −3.999 | 17.319 |
| 7.0 | 5.223 | −4.938 | 17.434 |
| 7.0 | 4.472 | −5.758 | 17.535 |
| 7.0 | 3.592 | −6.441 | 17.619 |
| 7.0 | 2.615 | −6.979 | 17.685 |
| 7.0 | 1.775 | −7.299 | 17.724 |
| 7.0 | 0.897 | −7.493 | 17.748 |
| 7.0 | 0.000 | −7.560 | 17.756 |
| 7.0 | −0.897 | −7.493 | 17.748 |
| 7.0 | −1.775 | −7.299 | 17.724 |
| 7.0 | −2.615 | −6.979 | 17.685 |
| 7.0 | −3.592 | −6.441 | 17.619 |
| 7.0 | −4.472 | −5.758 | 17.535 |
| 7.0 | −5.223 | −4.938 | 17.434 |
| 7.0 | −5.817 | −3.999 | 17.319 |
| 7.0 | −6.226 | −2.995 | 17.196 |
| 7.0 | −6.489 | −1.944 | 17.067 |
| 7.0 | −6.596 | −0.866 | 16.934 |
| 7.0 | −6.531 | 0.168 | 16.807 |
| 7.0 | −6.311 | 1.180 | 16.683 |
| 7.0 | −5.940 | 2.148 | 16.564 |
| 7.0 | −5.428 | 3.050 | 16.454 |
| 7.0 | −4.784 | 3.864 | 16.354 |
| 7.0 | −4.023 | 4.573 | 16.267 |
| 7.0 | −3.124 | 5.178 | 16.192 |
| 7.0 | −2.133 | 5.620 | 16.138 |
| 7.0 | −1.082 | 5.891 | 16.105 |
| 7.5 | 0.000 | 5.772 | 17.283 |
| 7.5 | 0.899 | 5.708 | 17.292 |
| 7.5 | 1.779 | 5.517 | 17.317 |
| 7.5 | 2.624 | 5.206 | 17.358 |
| 7.5 | 3.415 | 4.777 | 17.415 |
| 7.5 | 4.134 | 4.238 | 17.485 |
| 7.5 | 4.845 | 3.534 | 17.578 |
| 7.5 | 5.446 | 2.735 | 17.683 |
| 7.5 | 5.923 | 1.858 | 17.799 |
| 7.5 | 6.268 | 0.922 | 17.922 |
| 7.5 | 6.472 | −0.054 | 18.051 |
| 7.5 | 6.530 | −1.049 | 18.182 |
| 7.5 | 6.414 | −2.149 | 18.326 |
| 7.5 | 6.140 | −3.221 | 18.467 |
| 7.5 | 5.716 | −4.243 | 18.602 |
| 7.5 | 5.156 | −5.117 | 18.717 |
| 7.5 | 4.455 | −5.884 | 18.818 |
| 7.5 | 3.640 | −6.531 | 18.903 |
| 7.5 | 2.740 | −7.055 | 18.972 |
| 7.5 | 1.864 | −7.412 | 19.019 |
| 7.5 | 0.944 | −7.630 | 19.048 |
| 7.5 | 0.000 | −7.705 | 19.058 |
| 7.5 | −0.944 | −7.630 | 19.048 |

TABLE 1-continued

| Theta (deg.) | X | Y | Z |
|---|---|---|---|
| 7.5 | −1.864 | −7.412 | 19.019 |
| 7.5 | −2.740 | −7.055 | 18.972 |
| 7.5 | −3.640 | −6.531 | 18.903 |
| 7.5 | −4.455 | −5.884 | 18.818 |
| 7.5 | −5.156 | −5.117 | 18.717 |
| 7.5 | −5.716 | −4.243 | 18.602 |
| 7.5 | −6.140 | −3.221 | 18.467 |
| 7.5 | −6.414 | −2.149 | 18.326 |
| 7.5 | −6.530 | −1.049 | 18.182 |
| 7.5 | −6.472 | −0.054 | 18.051 |
| 7.5 | −6.268 | 0.922 | 17.922 |
| 7.5 | −5.923 | 1.858 | 17.799 |
| 7.5 | −5.446 | 2.735 | 17.683 |
| 7.5 | −4.845 | 3.534 | 17.578 |
| 7.5 | −4.134 | 4.238 | 17.485 |
| 7.5 | −3.415 | 4.777 | 17.415 |
| 7.5 | −2.624 | 5.206 | 17.358 |
| 7.5 | −1.779 | 5.517 | 17.317 |
| 7.5 | −0.899 | 5.708 | 17.292 |
| 8.0 | 0.000 | 5.544 | 18.482 |
| 8.0 | 0.933 | 5.473 | 18.492 |
| 8.0 | 1.844 | 5.264 | 18.522 |
| 8.0 | 2.714 | 4.925 | 18.569 |
| 8.0 | 3.522 | 4.458 | 18.635 |
| 8.0 | 4.249 | 3.874 | 18.717 |
| 8.0 | 4.909 | 3.176 | 18.815 |
| 8.0 | 5.465 | 2.395 | 18.925 |
| 8.0 | 5.907 | 1.544 | 19.045 |
| 8.0 | 6.225 | 0.641 | 19.171 |
| 8.0 | 6.412 | −0.297 | 19.303 |
| 8.0 | 6.463 | −1.252 | 19.438 |
| 8.0 | 6.341 | −2.369 | 19.595 |
| 8.0 | 6.057 | −3.458 | 19.748 |
| 8.0 | 5.617 | −4.494 | 19.893 |
| 8.0 | 5.095 | −5.303 | 20.007 |
| 8.0 | 4.449 | −6.019 | 20.107 |
| 8.0 | 3.703 | −6.633 | 20.194 |
| 8.0 | 2.881 | −7.142 | 20.265 |
| 8.0 | 1.966 | −7.542 | 20.322 |
| 8.0 | 0.997 | −7.787 | 20.356 |
| 8.0 | 0.000 | −7.871 | 20.368 |
| 8.0 | −0.997 | −7.787 | 20.356 |
| 8.0 | −1.966 | −7.542 | 20.322 |
| 8.0 | −2.881 | −7.142 | 20.265 |
| 8.0 | −3.703 | −6.633 | 20.194 |
| 8.0 | −4.449 | −6.019 | 20.107 |
| 8.0 | −5.095 | −5.303 | 20.007 |
| 8.0 | −5.617 | −4.494 | 19.893 |
| 8.0 | −6.057 | −3.458 | 19.748 |
| 8.0 | −6.341 | −2.369 | 19.595 |
| 8.0 | −6.463 | −1.252 | 19.438 |
| 8.0 | −6.412 | −0.297 | 19.303 |
| 8.0 | −6.225 | 0.641 | 19.171 |
| 8.0 | −5.907 | 1.544 | 19.045 |
| 8.0 | −5.465 | 2.395 | 18.925 |
| 8.0 | −4.909 | 3.176 | 18.815 |
| 8.0 | −4.249 | 3.874 | 18.717 |
| 8.0 | −3.522 | 4.458 | 18.635 |
| 8.0 | −2.714 | 4.925 | 18.569 |
| 8.0 | −1.844 | 5.264 | 18.522 |
| 8.0 | −0.933 | 5.473 | 18.492 |
| 8.5 | 0.000 | 5.298 | 19.691 |
| 8.5 | 0.969 | 5.220 | 19.703 |
| 8.5 | 1.913 | 4.991 | 19.737 |
| 8.5 | 2.809 | 4.620 | 19.792 |
| 8.5 | 3.634 | 4.111 | 19.868 |
| 8.5 | 4.367 | 3.479 | 19.963 |
| 8.5 | 4.975 | 2.790 | 20.066 |
| 8.5 | 5.486 | 2.028 | 20.180 |
| 8.5 | 5.891 | 1.206 | 20.303 |
| 8.5 | 6.182 | 0.337 | 20.432 |
| 8.5 | 6.351 | −0.562 | 20.567 |
| 8.5 | 6.395 | −1.475 | 20.703 |
| 8.5 | 6.270 | −2.606 | 20.872 |
| 8.5 | 5.977 | −3.707 | 21.037 |
| 8.5 | 5.521 | −4.752 | 21.193 |
| 8.5 | 5.038 | −5.496 | 21.304 |

TABLE 1-continued

| Theta (deg.) | X | Y | Z |
|---|---|---|---|
| 8.5 | 4.451 | −6.164 | 21.404 |
| 8.5 | 3.780 | −6.748 | 21.491 |
| 8.5 | 3.038 | −7.242 | 21.565 |
| 8.5 | 2.080 | −7.691 | 21.632 |
| 8.5 | 1.056 | −7.966 | 21.673 |
| 8.5 | 0.000 | −8.060 | 21.687 |
| 8.5 | −1.056 | −7.966 | 21.673 |
| 8.5 | −2.080 | −7.691 | 21.632 |
| 8.5 | −3.038 | −7.242 | 21.565 |
| 8.5 | −3.780 | −6.748 | 21.491 |
| 8.5 | −4.451 | −6.164 | 21.404 |
| 8.5 | −5.038 | −5.496 | 21.304 |
| 8.5 | −5.521 | −4.752 | 21.193 |
| 8.5 | −5.977 | −3.707 | 21.037 |
| 8.5 | −6.270 | −2.606 | 20.872 |
| 8.5 | −6.395 | −1.475 | 20.703 |
| 8.5 | −6.351 | −0.562 | 20.567 |
| 8.5 | −6.182 | 0.337 | 20.432 |
| 8.5 | −5.891 | 1.206 | 20.303 |
| 8.5 | −5.486 | 2.028 | 20.180 |
| 8.5 | −4.975 | 2.790 | 20.066 |
| 8.5 | −4.367 | 3.479 | 19.963 |
| 8.5 | −3.634 | 4.111 | 19.868 |
| 8.5 | −2.809 | 4.620 | 19.792 |
| 8.5 | −1.913 | 4.991 | 19.737 |
| 8.5 | −0.969 | 5.220 | 19.703 |
| 9.0 | 0.000 | 5.033 | 20.910 |
| 9.0 | 1.007 | 4.947 | 20.924 |
| 9.0 | 1.986 | 4.696 | 20.963 |
| 9.0 | 2.910 | 4.289 | 21.028 |
| 9.0 | 3.751 | 3.734 | 21.116 |
| 9.0 | 4.489 | 3.051 | 21.224 |
| 9.0 | 5.145 | 2.231 | 21.354 |
| 9.0 | 5.668 | 1.323 | 21.498 |
| 9.0 | 6.046 | 0.346 | 21.652 |
| 9.0 | 6.267 | −0.675 | 21.814 |
| 9.0 | 6.326 | −1.719 | 21.979 |
| 9.0 | 6.203 | −2.861 | 22.160 |
| 9.0 | 5.904 | −3.971 | 22.336 |
| 9.0 | 5.427 | −5.018 | 22.502 |
| 9.0 | 4.985 | −5.696 | 22.609 |
| 9.0 | 4.464 | −6.318 | 22.708 |
| 9.0 | 3.874 | −6.875 | 22.796 |
| 9.0 | 3.213 | −7.350 | 22.871 |
| 9.0 | 2.206 | −7.851 | 22.951 |
| 9.0 | 1.123 | −8.163 | 23.000 |
| 9.0 | 0.000 | −8.268 | 23.017 |
| 9.0 | −1.123 | −8.163 | 23.000 |
| 9.0 | −2.206 | −7.851 | 22.951 |
| 9.0 | −3.213 | −7.350 | 22.871 |
| 9.0 | −3.874 | −6.875 | 22.796 |
| 9.0 | −4.464 | −6.318 | 22.708 |
| 9.0 | −4.985 | −5.696 | 22.609 |
| 9.0 | −5.427 | −5.018 | 22.502 |
| 9.0 | −5.904 | −3.971 | 22.336 |
| 9.0 | −6.203 | −2.861 | 22.160 |
| 9.0 | −6.326 | −1.719 | 21.979 |
| 9.0 | −6.267 | −0.675 | 21.814 |
| 9.0 | −6.046 | 0.346 | 21.652 |
| 9.0 | −5.668 | 1.323 | 21.498 |
| 9.0 | −5.145 | 2.231 | 21.354 |
| 9.0 | −4.489 | 3.051 | 21.224 |
| 9.0 | −3.751 | 3.734 | 21.116 |
| 9.0 | −2.910 | 4.289 | 21.028 |
| 9.0 | −1.986 | 4.696 | 20.963 |
| 9.0 | −1.007 | 4.947 | 20.924 |
| 9.5 | 0.000 | 4.748 | 22.140 |
| 9.5 | 1.049 | 4.654 | 22.156 |
| 9.5 | 2.065 | 4.377 | 22.202 |
| 9.5 | 3.016 | 3.930 | 22.277 |
| 9.5 | 3.873 | 3.326 | 22.378 |
| 9.5 | 4.615 | 2.588 | 22.502 |
| 9.5 | 5.208 | 1.788 | 22.636 |
| 9.5 | 5.677 | 0.912 | 22.782 |
| 9.5 | 6.012 | −0.022 | 22.939 |
| 9.5 | 6.206 | −0.994 | 23.101 |
| 9.5 | 6.255 | −1.984 | 23.267 |

TABLE 1-continued

| Theta (deg.) | X | Y | Z |
|---|---|---|---|
| 9.5 | 6.188 | −2.846 | 23.411 |
| 9.5 | 6.022 | −3.695 | 23.553 |
| 9.5 | 5.752 | −4.517 | 23.691 |
| 9.5 | 5.371 | −5.295 | 23.821 |
| 9.5 | 4.977 | −5.912 | 23.924 |
| 9.5 | 4.520 | −6.486 | 24.020 |
| 9.5 | 3.999 | −7.004 | 24.107 |
| 9.5 | 3.409 | −7.443 | 24.180 |
| 9.5 | 2.618 | −7.867 | 24.251 |
| 9.5 | 1.776 | −8.181 | 24.304 |
| 9.5 | 0.898 | −8.373 | 24.336 |
| 9.5 | 0.000 | −8.437 | 24.347 |
| 9.5 | −0.898 | −8.373 | 24.336 |
| 9.5 | −1.776 | −8.181 | 24.304 |
| 9.5 | −2.618 | −7.867 | 24.251 |
| 9.5 | −3.409 | −7.443 | 24.180 |
| 9.5 | −3.999 | −7.004 | 24.107 |
| 9.5 | −4.520 | −6.486 | 24.020 |
| 9.5 | −4.977 | −5.912 | 23.924 |
| 9.5 | −5.371 | −5.295 | 23.821 |
| 9.5 | −5.752 | −4.517 | 23.691 |
| 9.5 | −6.022 | −3.695 | 23.553 |
| 9.5 | −6.188 | −2.846 | 23.411 |
| 9.5 | −6.255 | −1.984 | 23.267 |
| 9.5 | −6.206 | −0.994 | 23.101 |
| 9.5 | −6.012 | −0.022 | 22.939 |
| 9.5 | −5.677 | 0.912 | 22.782 |
| 9.5 | −5.208 | 1.788 | 22.636 |
| 9.5 | −4.615 | 2.588 | 22.502 |
| 9.5 | −3.873 | 3.326 | 22.378 |
| 9.5 | −3.016 | 3.930 | 22.277 |
| 9.5 | −2.065 | 4.377 | 22.202 |
| 9.5 | −1.049 | 4.654 | 22.156 |
| 10.0 | 0.000 | 4.443 | 23.383 |
| 10.0 | 0.913 | 4.370 | 23.396 |
| 10.0 | 1.804 | 4.157 | 23.433 |
| 10.0 | 2.650 | 3.811 | 23.494 |
| 10.0 | 3.432 | 3.340 | 23.577 |
| 10.0 | 4.134 | 2.761 | 23.679 |
| 10.0 | 4.746 | 2.088 | 23.798 |
| 10.0 | 5.275 | 1.313 | 23.935 |
| 10.0 | 5.688 | 0.471 | 24.083 |
| 10.0 | 5.977 | −0.419 | 24.240 |
| 10.0 | 6.147 | −1.338 | 24.402 |
| 10.0 | 6.205 | −2.271 | 24.567 |
| 10.0 | 6.174 | −3.133 | 24.719 |
| 10.0 | 6.045 | −3.985 | 24.869 |
| 10.0 | 5.792 | −4.810 | 25.014 |
| 10.0 | 5.408 | −5.584 | 25.151 |
| 10.0 | 5.048 | −6.139 | 25.249 |
| 10.0 | 4.636 | −6.658 | 25.340 |
| 10.0 | 4.166 | −7.127 | 25.423 |
| 10.0 | 3.628 | −7.518 | 25.492 |
| 10.0 | 2.784 | −7.958 | 25.569 |
| 10.0 | 1.887 | −8.283 | 25.627 |
| 10.0 | 0.953 | −8.481 | 25.662 |
| 10.0 | 0.000 | −8.546 | 25.673 |
| 10.0 | −0.953 | −8.481 | 25.662 |
| 10.0 | −1.887 | −8.283 | 25.627 |
| 10.0 | −2.784 | −7.958 | 25.569 |
| 10.0 | −3.628 | −7.518 | 25.492 |
| 10.0 | −4.166 | −7.127 | 25.423 |
| 10.0 | −4.636 | −6.658 | 25.340 |
| 10.0 | −5.048 | −6.139 | 25.249 |
| 10.0 | −5.408 | −5.584 | 25.151 |
| 10.0 | −5.792 | −4.810 | 25.014 |
| 10.0 | −6.045 | −3.985 | 24.869 |
| 10.0 | −6.174 | −3.133 | 24.719 |
| 10.0 | −6.205 | −2.271 | 24.567 |
| 10.0 | −6.147 | −1.338 | 24.402 |
| 10.0 | −5.977 | −0.419 | 24.240 |
| 10.0 | −5.688 | 0.471 | 24.083 |
| 10.0 | −5.275 | 1.313 | 23.935 |
| 10.0 | −4.746 | 2.088 | 23.798 |
| 10.0 | −4.134 | 2.761 | 23.679 |
| 10.0 | −3.432 | 3.340 | 23.577 |
| 10.0 | −2.650 | 3.811 | 23.494 |

TABLE 1-continued

| Theta (deg.) | X | Y | Z |
|---|---|---|---|
| 10.0 | −1.804 | 4.157 | 23.433 |
| 10.0 | −0.913 | 4.370 | 23.396 |
| 10.5 | 0.000 | 4.116 | 24.638 |
| 10.5 | 0.956 | 4.035 | 24.653 |
| 10.5 | 1.885 | 3.799 | 24.697 |
| 10.5 | 2.761 | 3.414 | 24.769 |
| 10.5 | 3.560 | 2.892 | 24.865 |
| 10.5 | 4.266 | 2.253 | 24.984 |
| 10.5 | 4.869 | 1.518 | 25.120 |
| 10.5 | 5.423 | 0.578 | 25.294 |
| 10.5 | 5.823 | −0.435 | 25.482 |
| 10.5 | 6.081 | −1.492 | 25.678 |
| 10.5 | 6.208 | −2.571 | 25.878 |
| 10.5 | 6.217 | −3.714 | 26.090 |
| 10.5 | 6.008 | −4.836 | 26.298 |
| 10.5 | 5.524 | −5.873 | 26.490 |
| 10.5 | 5.189 | −6.368 | 26.581 |
| 10.5 | 4.807 | −6.829 | 26.667 |
| 10.5 | 4.371 | −7.241 | 26.743 |
| 10.5 | 3.873 | −7.578 | 26.806 |
| 10.5 | 2.964 | −8.018 | 26.887 |
| 10.5 | 2.005 | −8.339 | 26.947 |
| 10.5 | 1.011 | −8.532 | 26.983 |
| 10.5 | 0.000 | −8.595 | 26.994 |
| 10.5 | −1.011 | −8.532 | 26.983 |
| 10.5 | −2.005 | −8.339 | 26.947 |
| 10.5 | −2.964 | −8.018 | 26.887 |
| 10.5 | −3.873 | −7.578 | 26.806 |
| 10.5 | −4.371 | −7.241 | 26.743 |
| 10.5 | −4.807 | −6.829 | 26.667 |
| 10.5 | −5.189 | −6.368 | 26.581 |
| 10.5 | −5.524 | −5.873 | 26.490 |
| 10.5 | −6.008 | −4.836 | 26.298 |
| 10.5 | −6.217 | −3.714 | 26.090 |
| 10.5 | −6.208 | −2.571 | 25.878 |
| 10.5 | −6.081 | −1.492 | 25.678 |
| 10.5 | −5.823 | −0.435 | 25.482 |
| 10.5 | −5.423 | 0.578 | 25.294 |
| 10.5 | −4.869 | 1.518 | 25.120 |
| 10.5 | −4.266 | 2.253 | 24.984 |
| 10.5 | −3.560 | 2.892 | 24.865 |
| 10.5 | −2.761 | 3.414 | 24.769 |
| 10.5 | −1.885 | 3.799 | 24.697 |
| 10.5 | −0.956 | 4.035 | 24.653 |
| 11.0 | 0.000 | 3.727 | 25.916 |
| 11.0 | 1.002 | 3.632 | 25.934 |
| 11.0 | 1.968 | 3.354 | 25.988 |
| 11.0 | 2.865 | 2.906 | 26.076 |
| 11.0 | 3.668 | 2.310 | 26.191 |
| 11.0 | 4.368 | 1.599 | 26.330 |
| 11.0 | 4.965 | 0.803 | 26.484 |
| 11.0 | 5.448 | −0.054 | 26.651 |
| 11.0 | 5.820 | −0.963 | 26.828 |
| 11.0 | 6.092 | −1.905 | 27.011 |
| 11.0 | 6.270 | −2.869 | 27.198 |
| 11.0 | 6.356 | −4.001 | 27.418 |
| 11.0 | 6.187 | −5.122 | 27.636 |
| 11.0 | 5.703 | −6.150 | 27.836 |
| 11.0 | 5.386 | −6.588 | 27.921 |
| 11.0 | 5.024 | −6.991 | 27.999 |
| 11.0 | 4.611 | −7.343 | 28.068 |
| 11.0 | 4.146 | −7.625 | 28.123 |
| 11.0 | 3.161 | −8.048 | 28.205 |
| 11.0 | 2.132 | −8.350 | 28.264 |
| 11.0 | 1.073 | −8.529 | 28.298 |
| 11.0 | 0.000 | −8.587 | 28.310 |
| 11.0 | −1.073 | −8.529 | 28.298 |
| 11.0 | −2.132 | −8.350 | 28.264 |
| 11.0 | −3.161 | −8.048 | 28.205 |
| 11.0 | −4.146 | −7.625 | 28.123 |
| 11.0 | −4.611 | −7.343 | 28.068 |
| 11.0 | −5.024 | −6.991 | 27.999 |
| 11.0 | −5.386 | −6.588 | 27.921 |
| 11.0 | −5.703 | −6.150 | 27.836 |
| 11.0 | −6.187 | −5.122 | 27.636 |
| 11.0 | −6.356 | −4.001 | 27.418 |
| 11.0 | −6.270 | −2.869 | 27.198 |

TABLE 1-continued

| Theta (deg.) | X | Y | Z |
|---|---|---|---|
| 11.0 | −6.092 | −1.905 | 27.011 |
| 11.0 | −5.820 | −0.963 | 26.828 |
| 11.0 | −5.448 | −0.054 | 26.651 |
| 11.0 | −4.965 | 0.803 | 26.484 |
| 11.0 | −4.368 | 1.599 | 26.330 |
| 11.0 | −3.668 | 2.310 | 26.191 |
| 11.0 | −2.865 | 2.906 | 26.076 |
| 11.0 | −1.968 | 3.354 | 25.988 |
| 11.0 | −1.002 | 3.632 | 25.934 |
| 11.5 | 0.000 | 3.220 | 27.229 |
| 11.5 | 1.044 | 3.105 | 27.252 |
| 11.5 | 2.039 | 2.776 | 27.319 |
| 11.5 | 2.950 | 2.261 | 27.424 |
| 11.5 | 3.754 | 1.597 | 27.559 |
| 11.5 | 4.458 | 0.831 | 27.715 |
| 11.5 | 5.073 | −0.005 | 27.885 |
| 11.5 | 5.511 | −0.743 | 28.035 |
| 11.5 | 5.875 | −1.519 | 28.193 |
| 11.5 | 6.171 | −2.323 | 28.356 |
| 11.5 | 6.395 | −3.148 | 28.524 |
| 11.5 | 6.550 | −4.266 | 28.752 |
| 11.5 | 6.411 | −5.383 | 28.979 |
| 11.5 | 5.929 | −6.404 | 29.187 |
| 11.5 | 5.629 | −6.792 | 29.266 |
| 11.5 | 5.282 | −7.139 | 29.336 |
| 11.5 | 4.887 | −7.434 | 29.396 |
| 11.5 | 4.448 | −7.662 | 29.443 |
| 11.5 | 3.595 | −7.980 | 29.507 |
| 11.5 | 2.716 | −8.222 | 29.557 |
| 11.5 | 1.820 | −8.390 | 29.591 |
| 11.5 | 0.912 | −8.489 | 29.611 |
| 11.5 | 0.000 | −8.521 | 29.618 |
| 11.5 | −0.912 | −8.489 | 29.611 |
| 11.5 | −1.820 | −8.390 | 29.591 |
| 11.5 | −2.716 | −8.222 | 29.557 |
| 11.5 | −3.595 | −7.980 | 29.507 |
| 11.5 | −4.448 | −7.662 | 29.443 |
| 11.5 | −4.887 | −7.434 | 29.396 |
| 11.5 | −5.282 | −7.139 | 29.336 |
| 11.5 | −5.629 | −6.792 | 29.266 |
| 11.5 | −5.929 | −6.404 | 29.187 |
| 11.5 | −6.411 | −5.383 | 28.979 |
| 11.5 | −6.550 | −4.266 | 28.752 |
| 11.5 | −6.395 | −3.148 | 28.524 |
| 11.5 | −6.171 | −2.323 | 28.356 |
| 11.5 | −5.875 | −1.519 | 28.193 |
| 11.5 | −5.511 | −0.743 | 28.035 |
| 11.5 | −5.073 | −0.005 | 27.885 |
| 11.5 | −4.458 | 0.831 | 27.715 |
| 11.5 | −3.754 | 1.597 | 27.559 |
| 11.5 | −2.950 | 2.261 | 27.424 |
| 11.5 | −2.039 | 2.776 | 27.319 |
| 11.5 | −1.044 | 3.105 | 27.252 |
| 12.0 | 0.000 | 2.573 | 28.585 |
| 12.0 | 0.926 | 2.474 | 28.606 |
| 12.0 | 1.813 | 2.195 | 28.665 |
| 12.0 | 2.635 | 1.766 | 28.756 |
| 12.0 | 3.382 | 1.220 | 28.872 |
| 12.0 | 4.057 | 0.590 | 29.006 |
| 12.0 | 4.675 | −0.094 | 29.152 |
| 12.0 | 5.247 | −0.815 | 29.305 |
| 12.0 | 5.661 | −1.418 | 29.433 |
| 12.0 | 6.026 | −2.050 | 29.567 |
| 12.0 | 6.340 | −2.708 | 29.707 |
| 12.0 | 6.589 | −3.392 | 29.853 |
| 12.0 | 6.789 | −4.495 | 30.087 |
| 12.0 | 6.662 | −5.607 | 30.323 |
| 12.0 | 6.186 | −6.623 | 30.539 |
| 12.0 | 5.906 | −6.970 | 30.613 |
| 12.0 | 5.574 | −7.270 | 30.677 |
| 12.0 | 5.196 | −7.512 | 30.728 |
| 12.0 | 4.783 | −7.691 | 30.766 |
| 12.0 | 3.852 | −7.963 | 30.824 |
| 12.0 | 2.901 | −8.160 | 30.866 |
| 12.0 | 1.940 | −8.295 | 30.895 |
| 12.0 | 0.971 | −8.373 | 30.911 |
| 12.0 | 0.000 | −8.399 | 30.917 |

TABLE 1-continued

| Theta (deg.) | X | Y | Z |
|---|---|---|---|
| 12.0 | −0.971 | −8.373 | 30.911 |
| 12.0 | −1.940 | −8.295 | 30.895 |
| 12.0 | −2.901 | −8.160 | 30.866 |
| 12.0 | −3.852 | −7.963 | 30.824 |
| 12.0 | −4.783 | −7.691 | 30.766 |
| 12.0 | −5.196 | −7.512 | 30.728 |
| 12.0 | −5.574 | −7.270 | 30.677 |
| 12.0 | −5.906 | −6.970 | 30.613 |
| 12.0 | −6.186 | −6.623 | 30.539 |
| 12.0 | −6.662 | −5.607 | 30.323 |
| 12.0 | −6.789 | −4.495 | 30.087 |
| 12.0 | −6.589 | −3.392 | 29.853 |
| 12.0 | −6.340 | −2.708 | 29.707 |
| 12.0 | −6.026 | −2.050 | 29.567 |
| 12.0 | −5.661 | −1.418 | 29.433 |
| 12.0 | −5.247 | −0.815 | 29.305 |
| 12.0 | −4.675 | −0.094 | 29.152 |
| 12.0 | −4.057 | 0.590 | 29.006 |
| 12.0 | −3.382 | 1.220 | 28.872 |
| 12.0 | −2.635 | 1.766 | 28.756 |
| 12.0 | −1.813 | 2.195 | 28.665 |
| 12.0 | −0.926 | 2.474 | 28.606 |
| 12.5 | 0.000 | 1.747 | 29.997 |
| 12.5 | 0.944 | 1.643 | 30.020 |
| 12.5 | 1.848 | 1.356 | 30.083 |
| 12.5 | 2.691 | 0.926 | 30.179 |
| 12.5 | 3.470 | 0.393 | 30.297 |
| 12.5 | 4.193 | −0.210 | 30.431 |
| 12.5 | 4.878 | −0.856 | 30.574 |
| 12.5 | 5.535 | −1.528 | 30.723 |
| 12.5 | 5.938 | −1.995 | 30.826 |
| 12.5 | 6.301 | −2.493 | 30.937 |
| 12.5 | 6.612 | −3.023 | 31.054 |
| 12.5 | 6.854 | −3.586 | 31.179 |
| 12.5 | 7.058 | −4.679 | 31.421 |
| 12.5 | 6.921 | −5.781 | 31.666 |
| 12.5 | 6.458 | −6.795 | 31.890 |
| 12.5 | 6.202 | −7.111 | 31.961 |
| 12.5 | 5.890 | −7.375 | 32.019 |
| 12.5 | 5.531 | −7.574 | 32.063 |
| 12.5 | 5.142 | −7.708 | 32.093 |
| 12.5 | 4.128 | −7.913 | 32.138 |
| 12.5 | 3.102 | −8.054 | 32.169 |
| 12.5 | 2.070 | −8.147 | 32.190 |
| 12.5 | 1.036 | −8.202 | 32.202 |
| 12.5 | 0.000 | −8.221 | 32.206 |
| 12.5 | −1.036 | −8.202 | 32.202 |
| 12.5 | −2.070 | −8.147 | 32.190 |
| 12.5 | −3.102 | −8.054 | 32.169 |
| 12.5 | −4.128 | −7.913 | 32.138 |
| 12.5 | −5.142 | −7.708 | 32.093 |
| 12.5 | −5.531 | −7.574 | 32.063 |
| 12.5 | −5.890 | −7.375 | 32.019 |
| 12.5 | −6.202 | −7.111 | 31.961 |
| 12.5 | −6.458 | −6.795 | 31.890 |
| 12.5 | −6.921 | −5.781 | 31.666 |
| 12.5 | −7.058 | −4.679 | 31.421 |
| 12.5 | −6.854 | −3.586 | 31.179 |
| 12.5 | −6.612 | −3.023 | 31.054 |
| 12.5 | −6.301 | −2.493 | 30.937 |
| 12.5 | −5.938 | −1.995 | 30.826 |
| 12.5 | −5.535 | −1.528 | 30.723 |
| 12.5 | −4.878 | −0.856 | 30.574 |
| 12.5 | −4.193 | −0.210 | 30.431 |
| 12.5 | −3.470 | 0.393 | 30.297 |
| 12.5 | −2.691 | 0.926 | 30.179 |
| 12.5 | −1.848 | 1.356 | 30.083 |
| 12.5 | −0.944 | 1.643 | 30.020 |
| 13.0 | 0.000 | 0.682 | 31.484 |
| 13.0 | 0.954 | 0.593 | 31.504 |
| 13.0 | 1.880 | 0.350 | 31.560 |
| 13.0 | 2.764 | −0.012 | 31.644 |
| 13.0 | 3.607 | −0.459 | 31.747 |
| 13.0 | 4.415 | −0.964 | 31.864 |
| 13.0 | 5.199 | −1.502 | 31.988 |
| 13.0 | 5.964 | −2.067 | 32.118 |
| 13.0 | 6.357 | −2.412 | 32.198 |

TABLE 1-continued

| Theta (deg.) | X | Y | Z |
|---|---|---|---|
| 13.0 | 6.700 | −2.804 | 32.289 |
| 13.0 | 6.979 | −3.241 | 32.390 |
| 13.0 | 7.184 | −3.716 | 32.499 |
| 13.0 | 7.337 | −4.806 | 32.751 |
| 13.0 | 7.171 | −5.895 | 33.002 |
| 13.0 | 6.730 | −6.909 | 33.236 |
| 13.0 | 6.501 | −7.204 | 33.304 |
| 13.0 | 6.211 | −7.441 | 33.359 |
| 13.0 | 5.870 | −7.604 | 33.397 |
| 13.0 | 5.503 | −7.698 | 33.418 |
| 13.0 | 4.591 | −7.806 | 33.443 |
| 13.0 | 3.674 | −7.877 | 33.460 |
| 13.0 | 2.757 | −7.927 | 33.471 |
| 13.0 | 1.838 | −7.960 | 33.479 |
| 13.0 | 0.919 | −7.980 | 33.484 |
| 13.0 | 0.000 | −7.987 | 33.485 |
| 13.0 | −0.919 | −7.980 | 33.484 |
| 13.0 | −1.838 | −7.960 | 33.479 |
| 13.0 | −2.757 | −7.927 | 33.471 |
| 13.0 | −3.674 | −7.877 | 33.460 |
| 13.0 | −4.591 | −7.806 | 33.443 |
| 13.0 | −5.503 | −7.698 | 33.418 |
| 13.0 | −5.870 | −7.604 | 33.397 |
| 13.0 | −6.211 | −7.441 | 33.359 |
| 13.0 | −6.501 | −7.204 | 33.304 |
| 13.0 | −6.730 | −6.909 | 33.236 |
| 13.0 | −7.171 | −5.895 | 33.002 |
| 13.0 | −7.337 | −4.806 | 32.751 |
| 13.0 | −7.184 | −3.716 | 32.499 |
| 13.0 | −6.979 | −3.241 | 32.390 |
| 13.0 | −6.700 | −2.804 | 32.289 |
| 13.0 | −6.357 | −2.412 | 32.198 |
| 13.0 | −5.964 | −2.067 | 32.118 |
| 13.0 | −5.199 | −1.502 | 31.988 |
| 13.0 | −4.415 | −0.964 | 31.864 |
| 13.0 | −3.607 | −0.459 | 31.747 |
| 13.0 | −2.764 | −0.012 | 31.644 |
| 13.0 | −1.880 | 0.350 | 31.560 |
| 13.0 | −0.954 | 0.593 | 31.504 |
| 13.5 | 0.000 | −0.590 | 33.045 |
| 13.5 | 0.974 | −0.631 | 33.055 |
| 13.5 | 1.941 | −0.755 | 33.085 |
| 13.5 | 2.892 | −0.962 | 33.135 |
| 13.5 | 3.824 | −1.241 | 33.202 |
| 13.5 | 4.734 | −1.584 | 33.284 |
| 13.5 | 5.621 | −1.976 | 33.378 |
| 13.5 | 6.487 | −2.413 | 33.483 |
| 13.5 | 6.855 | −2.664 | 33.543 |
| 13.5 | 7.162 | −2.983 | 33.620 |
| 13.5 | 7.393 | −3.358 | 33.710 |
| 13.5 | 7.541 | −3.770 | 33.809 |
| 13.5 | 7.601 | −4.860 | 34.070 |
| 13.5 | 7.398 | −5.936 | 34.329 |
| 13.5 | 6.984 | −6.953 | 34.573 |
| 13.5 | 6.782 | −7.233 | 34.640 |
| 13.5 | 6.513 | −7.453 | 34.693 |
| 13.5 | 6.190 | −7.588 | 34.725 |
| 13.5 | 5.843 | −7.648 | 34.740 |
| 13.5 | 4.870 | −7.680 | 34.747 |
| 13.5 | 3.896 | −7.690 | 34.750 |
| 13.5 | 2.922 | −7.695 | 34.751 |
| 13.5 | 1.948 | −7.697 | 34.751 |
| 13.5 | 0.974 | −7.698 | 34.752 |
| 13.5 | 0.000 | −7.699 | 34.752 |
| 13.5 | −0.974 | −7.698 | 34.752 |
| 13.5 | −1.948 | −7.697 | 34.751 |
| 13.5 | −2.922 | −7.695 | 34.751 |
| 13.5 | −3.896 | −7.690 | 34.750 |
| 13.5 | −4.870 | −7.680 | 34.747 |
| 13.5 | −5.843 | −7.648 | 34.740 |
| 13.5 | −6.190 | −7.588 | 34.725 |
| 13.5 | −6.513 | −7.453 | 34.693 |
| 13.5 | −6.782 | −7.233 | 34.640 |
| 13.5 | −6.984 | −6.953 | 34.573 |
| 13.5 | −7.398 | −5.936 | 34.329 |
| 13.5 | −7.601 | −4.860 | 34.070 |
| 13.5 | −7.541 | −3.770 | 33.809 |

TABLE 1-continued

| Theta (deg.) | X | Y | Z |
|---|---|---|---|
| 13.5 | −7.393 | −3.358 | 33.710 |
| 13.5 | −7.162 | −2.983 | 33.620 |
| 13.5 | −6.855 | −2.664 | 33.543 |
| 13.5 | −6.487 | −2.413 | 33.483 |
| 13.5 | −5.621 | −1.976 | 33.378 |
| 13.5 | −4.734 | −1.584 | 33.284 |
| 13.5 | −3.824 | −1.241 | 33.202 |
| 13.5 | −2.892 | −0.962 | 33.135 |
| 13.5 | −1.941 | −0.755 | 33.085 |
| 13.5 | −0.974 | −0.631 | 33.055 |
| 14.0 | 0.000 | −1.294 | 34.494 |
| 14.0 | 1.025 | −1.316 | 34.499 |
| 14.0 | 2.048 | −1.389 | 34.518 |
| 14.0 | 3.064 | −1.518 | 34.550 |
| 14.0 | 4.071 | −1.704 | 34.596 |
| 14.0 | 5.065 | −1.947 | 34.657 |
| 14.0 | 6.045 | −2.240 | 34.730 |
| 14.0 | 7.008 | −2.581 | 34.815 |
| 14.0 | 7.346 | −2.767 | 34.861 |
| 14.0 | 7.616 | −3.038 | 34.929 |
| 14.0 | 7.795 | −3.373 | 35.012 |
| 14.0 | 7.882 | −3.740 | 35.104 |
| 14.0 | 7.828 | −4.827 | 35.375 |
| 14.0 | 7.588 | −5.891 | 35.640 |
| 14.0 | 7.204 | −6.915 | 35.895 |
| 14.0 | 7.028 | −7.187 | 35.963 |
| 14.0 | 6.777 | −7.395 | 36.015 |
| 14.0 | 6.469 | −7.511 | 36.044 |
| 14.0 | 6.140 | −7.542 | 36.052 |
| 14.0 | 5.117 | −7.496 | 36.040 |
| 14.0 | 4.094 | −7.448 | 36.028 |
| 14.0 | 3.071 | −7.407 | 36.018 |
| 14.0 | 2.048 | −7.378 | 36.011 |
| 14.0 | 1.024 | −7.361 | 36.007 |
| 14.0 | 0.000 | −7.356 | 36.005 |
| 14.0 | −1.024 | −7.361 | 36.007 |
| 14.0 | −2.048 | −7.378 | 36.011 |
| 14.0 | −3.071 | −7.407 | 36.018 |
| 14.0 | −4.094 | −7.448 | 36.028 |
| 14.0 | −5.117 | −7.496 | 36.040 |
| 14.0 | −6.140 | −7.542 | 36.052 |
| 14.0 | −6.469 | −7.511 | 36.044 |
| 14.0 | −6.777 | −7.395 | 36.015 |
| 14.0 | −7.028 | −7.187 | 35.963 |
| 14.0 | −7.204 | −6.915 | 35.895 |
| 14.0 | −7.588 | −5.891 | 35.640 |
| 14.0 | −7.828 | −4.827 | 35.375 |
| 14.0 | −7.882 | −3.740 | 35.104 |
| 14.0 | −7.795 | −3.373 | 35.012 |
| 14.0 | −7.616 | −3.038 | 34.929 |
| 14.0 | −7.346 | −2.767 | 34.861 |
| 14.0 | −7.008 | −2.581 | 34.815 |
| 14.0 | −6.045 | −2.240 | 34.730 |
| 14.0 | −5.065 | −1.947 | 34.657 |
| 14.0 | −4.071 | −1.704 | 34.596 |
| 14.0 | −3.064 | −1.518 | 34.550 |
| 14.0 | −2.048 | −1.389 | 34.518 |
| 14.0 | −1.025 | −1.316 | 34.499 |
| 14.5 | 0.000 | −1.575 | 35.852 |
| 14.5 | 0.943 | −1.588 | 35.855 |
| 14.5 | 1.885 | −1.630 | 35.866 |
| 14.5 | 2.825 | −1.705 | 35.885 |
| 14.5 | 3.761 | −1.813 | 35.913 |
| 14.5 | 4.693 | −1.956 | 35.950 |
| 14.5 | 5.618 | −2.134 | 35.996 |
| 14.5 | 6.536 | −2.343 | 36.050 |
| 14.5 | 7.445 | −2.584 | 36.113 |
| 14.5 | 7.758 | −2.730 | 36.150 |
| 14.5 | 7.998 | −2.972 | 36.213 |
| 14.5 | 8.133 | −3.282 | 36.293 |
| 14.5 | 8.165 | −3.617 | 36.380 |
| 14.5 | 7.999 | −4.695 | 36.658 |
| 14.5 | 7.730 | −5.753 | 36.932 |
| 14.5 | 7.377 | −6.788 | 37.200 |
| 14.5 | 7.222 | −7.054 | 37.269 |
| 14.5 | 6.987 | −7.257 | 37.321 |
| 14.5 | 6.691 | −7.362 | 37.348 |

TABLE 1-continued

| Theta (deg.) | X | Y | Z |
|---|---|---|---|
| 14.5 | 6.375 | −7.371 | 37.351 |
| 14.5 | 5.316 | −7.251 | 37.320 |
| 14.5 | 4.256 | −7.147 | 37.293 |
| 14.5 | 3.194 | −7.065 | 37.271 |
| 14.5 | 2.130 | −7.005 | 37.256 |
| 14.5 | 1.065 | −6.970 | 37.247 |
| 14.5 | 0.000 | −6.958 | 37.244 |
| 14.5 | −1.065 | −6.970 | 37.247 |
| 14.5 | −2.130 | −7.005 | 37.256 |
| 14.5 | −3.194 | −7.065 | 37.271 |
| 14.5 | −4.256 | −7.147 | 37.293 |
| 14.5 | −5.316 | −7.251 | 37.320 |
| 14.5 | −6.375 | −7.371 | 37.351 |
| 14.5 | −6.691 | −7.362 | 37.348 |
| 14.5 | −6.987 | −7.257 | 37.321 |
| 14.5 | −7.222 | −7.054 | 37.269 |
| 14.5 | −7.377 | −6.788 | 37.200 |
| 14.5 | −7.730 | −5.753 | 36.932 |
| 14.5 | −7.999 | −4.695 | 36.658 |
| 14.5 | −8.165 | −3.617 | 36.380 |
| 14.5 | −8.133 | −3.282 | 36.293 |
| 14.5 | −7.998 | −2.972 | 36.213 |
| 14.5 | −7.758 | −2.730 | 36.150 |
| 14.5 | −7.445 | −2.584 | 36.113 |
| 14.5 | −6.536 | −2.343 | 36.050 |
| 14.5 | −5.618 | −2.134 | 35.996 |
| 14.5 | −4.693 | −1.956 | 35.950 |
| 14.5 | −3.761 | −1.813 | 35.913 |
| 14.5 | −2.825 | −1.705 | 35.885 |
| 14.5 | −1.885 | −1.630 | 35.866 |
| 14.5 | −0.943 | −1.588 | 35.855 |
| 15.0 | 0.000 | −1.547 | 37.138 |
| 15.0 | 0.975 | −1.560 | 37.141 |
| 15.0 | 1.949 | −1.598 | 37.152 |
| 15.0 | 2.921 | −1.665 | 37.170 |
| 15.0 | 3.891 | −1.760 | 37.195 |
| 15.0 | 4.858 | −1.884 | 37.228 |
| 15.0 | 5.820 | −2.037 | 37.269 |
| 15.0 | 6.776 | −2.218 | 37.318 |
| 15.0 | 7.728 | −2.424 | 37.373 |
| 15.0 | 8.025 | −2.552 | 37.407 |
| 15.0 | 8.247 | −2.781 | 37.469 |
| 15.0 | 8.356 | −3.077 | 37.548 |
| 15.0 | 8.349 | −3.392 | 37.632 |
| 15.0 | 8.097 | −4.457 | 37.918 |
| 15.0 | 7.809 | −5.514 | 38.201 |
| 15.0 | 7.488 | −6.562 | 38.482 |
| 15.0 | 7.349 | −6.826 | 38.552 |
| 15.0 | 7.123 | −7.027 | 38.606 |
| 15.0 | 6.834 | −7.128 | 38.633 |
| 15.0 | 6.527 | −7.122 | 38.632 |
| 15.0 | 5.604 | −6.961 | 38.589 |
| 15.0 | 4.676 | −6.825 | 38.552 |
| 15.0 | 3.745 | −6.711 | 38.522 |
| 15.0 | 2.811 | −6.623 | 38.498 |
| 15.0 | 1.876 | −6.559 | 38.481 |
| 15.0 | 0.938 | −6.520 | 38.470 |
| 15.0 | 0.000 | −6.507 | 38.467 |
| 15.0 | −0.938 | −6.520 | 38.470 |
| 15.0 | −1.876 | −6.559 | 38.481 |
| 15.0 | −2.811 | −6.623 | 38.498 |
| 15.0 | −3.745 | −6.711 | 38.522 |
| 15.0 | −4.676 | −6.825 | 38.552 |
| 15.0 | −5.604 | −6.961 | 38.589 |
| 15.0 | −6.527 | −7.122 | 38.632 |
| 15.0 | −6.834 | −7.128 | 38.633 |
| 15.0 | −7.123 | −7.027 | 38.606 |
| 15.0 | −7.349 | −6.826 | 38.552 |
| 15.0 | −7.488 | −6.562 | 38.482 |
| 15.0 | −7.809 | −5.514 | 38.201 |
| 15.0 | −8.097 | −4.457 | 37.918 |
| 15.0 | −8.349 | −3.392 | 37.632 |
| 15.0 | −8.356 | −3.077 | 37.548 |
| 15.0 | −8.247 | −2.781 | 37.469 |
| 15.0 | −8.025 | −2.552 | 37.407 |
| 15.0 | −7.728 | −2.424 | 37.373 |
| 15.0 | −6.776 | −2.218 | 37.318 |

TABLE 1-continued

| Theta (deg.) | X | Y | Z |
|---|---|---|---|
| 15.0 | −5.820 | −2.037 | 37.269 |
| 15.0 | −4.858 | −1.884 | 37.228 |
| 15.0 | −3.891 | −1.760 | 37.195 |
| 15.0 | −2.921 | −1.665 | 37.170 |
| 15.0 | −1.949 | −1.598 | 37.152 |
| 15.0 | −0.975 | −1.560 | 37.141 |
| 15.5 | 0.000 | −1.262 | 38.358 |
| 15.5 | 0.984 | −1.276 | 38.362 |
| 15.5 | 1.968 | −1.316 | 38.373 |
| 15.5 | 2.949 | −1.382 | 38.391 |
| 15.5 | 3.929 | −1.475 | 38.417 |
| 15.5 | 4.905 | −1.594 | 38.450 |
| 15.5 | 5.878 | −1.739 | 38.491 |
| 15.5 | 6.846 | −1.911 | 38.538 |
| 15.5 | 7.809 | −2.109 | 38.593 |
| 15.5 | 8.100 | −2.236 | 38.628 |
| 15.5 | 8.316 | −2.463 | 38.691 |
| 15.5 | 8.423 | −2.753 | 38.772 |
| 15.5 | 8.404 | −3.060 | 38.857 |
| 15.5 | 8.110 | −4.117 | 39.150 |
| 15.5 | 7.817 | −5.173 | 39.443 |
| 15.5 | 7.523 | −6.229 | 39.736 |
| 15.5 | 7.390 | −6.492 | 39.809 |
| 15.5 | 7.165 | −6.689 | 39.863 |
| 15.5 | 6.880 | −6.790 | 39.891 |
| 15.5 | 6.576 | −6.782 | 39.889 |
| 15.5 | 5.649 | −6.597 | 39.838 |
| 15.5 | 4.716 | −6.440 | 39.794 |
| 15.5 | 3.778 | −6.311 | 39.759 |
| 15.5 | 2.837 | −6.211 | 39.731 |
| 15.5 | 1.893 | −6.140 | 39.711 |
| 15.5 | 0.947 | −6.097 | 39.699 |
| 15.5 | 0.000 | −6.082 | 39.695 |
| 15.5 | −0.947 | −6.097 | 39.699 |
| 15.5 | −1.893 | −6.140 | 39.711 |
| 15.5 | −2.837 | −6.211 | 39.731 |
| 15.5 | −3.778 | −6.311 | 39.759 |
| 15.5 | −4.716 | −6.440 | 39.794 |
| 15.5 | −5.649 | −6.597 | 39.838 |
| 15.5 | −6.576 | −6.782 | 39.889 |
| 15.5 | −6.880 | −6.790 | 39.891 |
| 15.5 | −7.165 | −6.689 | 39.863 |
| 15.5 | −7.390 | −6.492 | 39.809 |
| 15.5 | −7.523 | −6.229 | 39.736 |
| 15.5 | −7.817 | −5.173 | 39.443 |
| 15.5 | −8.110 | −4.117 | 39.150 |
| 15.5 | −8.404 | −3.060 | 38.857 |
| 15.5 | −8.423 | −2.753 | 38.772 |
| 15.5 | −8.316 | −2.463 | 38.691 |
| 15.5 | −8.100 | −2.236 | 38.628 |
| 15.5 | −7.809 | −2.109 | 38.593 |
| 15.5 | −6.846 | −1.911 | 38.538 |
| 15.5 | −5.878 | −1.739 | 38.491 |
| 15.5 | −4.905 | −1.594 | 38.450 |
| 15.5 | −3.929 | −1.475 | 38.417 |
| 15.5 | −2.949 | −1.382 | 38.391 |
| 15.5 | −1.968 | −1.316 | 38.373 |
| 15.5 | −0.984 | −1.276 | 38.362 |
| 16.0 | 0.000 | −0.896 | 39.556 |
| 16.0 | 0.984 | −0.909 | 39.560 |
| 16.0 | 1.968 | −0.949 | 39.572 |
| 16.0 | 2.949 | −1.015 | 39.591 |
| 16.0 | 3.929 | −1.108 | 39.617 |
| 16.0 | 4.905 | −1.227 | 39.651 |
| 16.0 | 5.878 | −1.372 | 39.693 |
| 16.0 | 6.846 | −1.543 | 39.742 |
| 16.0 | 7.809 | −1.740 | 39.798 |
| 16.0 | 8.100 | −1.867 | 39.835 |
| 16.0 | 8.316 | −2.093 | 39.900 |
| 16.0 | 8.423 | −2.383 | 39.983 |
| 16.0 | 8.404 | −2.689 | 40.071 |
| 16.0 | 8.110 | −3.743 | 40.373 |
| 16.0 | 7.817 | −4.796 | 40.675 |
| 16.0 | 7.523 | −5.849 | 40.977 |
| 16.0 | 7.390 | −6.112 | 41.052 |
| 16.0 | 7.165 | −6.308 | 41.108 |
| 16.0 | 6.880 | −6.409 | 41.137 |

TABLE 1-continued

| Theta (deg.) | X | Y | Z |
|---|---|---|---|
| 16.0 | 6.576 | −6.401 | 41.135 |
| 16.0 | 5.649 | −6.216 | 41.082 |
| 16.0 | 4.716 | −6.060 | 41.037 |
| 16.0 | 3.778 | −5.932 | 41.000 |
| 16.0 | 2.837 | −5.832 | 40.972 |
| 16.0 | 1.893 | −5.760 | 40.951 |
| 16.0 | 0.947 | −5.718 | 40.939 |
| 16.0 | 0.000 | −5.703 | 40.935 |
| 16.0 | −0.947 | −5.718 | 40.939 |
| 16.0 | −1.893 | −5.760 | 40.951 |
| 16.0 | −2.837 | −5.832 | 40.972 |
| 16.0 | −3.778 | −5.932 | 41.000 |
| 16.0 | −4.716 | −6.060 | 41.037 |
| 16.0 | −5.649 | −6.216 | 41.082 |
| 16.0 | −6.576 | −6.401 | 41.135 |
| 16.0 | −6.880 | −6.409 | 41.137 |
| 16.0 | −7.165 | −6.308 | 41.108 |
| 16.0 | −7.390 | −6.112 | 41.052 |
| 16.0 | −7.523 | −5.849 | 40.977 |
| 16.0 | −7.817 | −4.796 | 40.675 |
| 16.0 | −8.110 | −3.743 | 40.373 |
| 16.0 | −8.404 | −2.689 | 40.071 |
| 16.0 | −8.423 | −2.383 | 39.983 |
| 16.0 | −8.316 | −2.093 | 39.900 |
| 16.0 | −8.100 | −1.867 | 39.835 |
| 16.0 | −7.809 | −1.740 | 39.798 |
| 16.0 | −6.846 | −1.543 | 39.742 |
| 16.0 | −5.878 | −1.372 | 39.693 |
| 16.0 | −4.905 | −1.227 | 39.651 |
| 16.0 | −3.929 | −1.108 | 39.617 |
| 16.0 | −2.949 | −1.015 | 39.591 |
| 16.0 | −1.968 | −0.949 | 39.572 |
| 16.0 | −0.984 | −0.909 | 39.560 |
| 16.5 | 0.000 | −0.530 | 40.754 |
| 16.5 | 0.984 | −0.543 | 40.758 |
| 16.5 | 1.968 | −0.583 | 40.770 |
| 16.5 | 2.949 | −0.649 | 40.789 |
| 16.5 | 3.929 | −0.741 | 40.817 |
| 16.5 | 4.905 | −0.860 | 40.852 |
| 16.5 | 5.878 | −1.005 | 40.895 |
| 16.5 | 6.846 | −1.175 | 40.945 |
| 16.5 | 7.809 | −1.372 | 41.003 |
| 16.5 | 8.100 | −1.498 | 41.041 |
| 16.5 | 8.316 | −1.724 | 41.108 |
| 16.5 | 8.423 | −2.013 | 41.193 |
| 16.5 | 8.404 | −2.318 | 41.284 |
| 16.5 | 8.110 | −3.369 | 41.595 |
| 16.5 | 7.817 | −4.419 | 41.906 |
| 16.5 | 7.523 | −5.470 | 42.217 |
| 16.5 | 7.390 | −5.732 | 42.295 |
| 16.5 | 7.165 | −5.928 | 42.353 |
| 16.5 | 6.880 | −6.028 | 42.383 |
| 16.5 | 6.576 | −6.020 | 42.380 |
| 16.5 | 5.649 | −5.836 | 42.326 |
| 16.5 | 4.716 | −5.680 | 42.280 |
| 16.5 | 3.778 | −5.552 | 42.242 |
| 16.5 | 2.837 | −5.453 | 42.212 |
| 16.5 | 1.893 | −5.381 | 42.191 |
| 16.5 | 0.947 | −5.339 | 42.178 |
| 16.5 | 0.000 | −5.324 | 42.174 |
| 16.5 | −0.947 | −5.339 | 42.178 |
| 16.5 | −1.893 | −5.381 | 42.191 |
| 16.5 | −2.837 | −5.453 | 42.212 |
| 16.5 | −3.778 | −5.552 | 42.242 |
| 16.5 | −4.716 | −5.680 | 42.280 |
| 16.5 | −5.649 | −5.836 | 42.326 |
| 16.5 | −6.576 | −6.020 | 42.380 |
| 16.5 | −6.880 | −6.028 | 42.383 |
| 16.5 | −7.165 | −5.928 | 42.353 |
| 16.5 | −7.390 | −5.732 | 42.295 |
| 16.5 | −7.523 | −5.470 | 42.217 |
| 16.5 | −7.817 | −4.419 | 41.906 |
| 16.5 | −8.110 | −3.369 | 41.595 |
| 16.5 | −8.404 | −2.318 | 41.284 |
| 16.5 | −8.423 | −2.013 | 41.193 |
| 16.5 | −8.316 | −1.724 | 41.108 |
| 16.5 | −8.100 | −1.498 | 41.041 |

TABLE 1-continued

| Theta (deg.) | X | Y | Z |
|---|---|---|---|
| 16.5 | −7.809 | −1.372 | 41.003 |
| 16.5 | −6.846 | −1.175 | 40.945 |
| 16.5 | −5.878 | −1.005 | 40.895 |
| 16.5 | −4.905 | −0.860 | 40.852 |
| 16.5 | −3.929 | −0.741 | 40.817 |
| 16.5 | −2.949 | −0.649 | 40.789 |
| 16.5 | −1.968 | −0.583 | 40.770 |
| 16.5 | −0.984 | −0.543 | 40.758 |
| 17.0 | 0.000 | −0.164 | 41.952 |
| 17.0 | 0.984 | −0.177 | 41.956 |
| 17.0 | 1.968 | −0.217 | 41.968 |
| 17.0 | 2.949 | −0.282 | 41.988 |
| 17.0 | 3.929 | −0.375 | 42.016 |
| 17.0 | 4.905 | −0.493 | 42.052 |
| 17.0 | 5.878 | −0.637 | 42.096 |
| 17.0 | 6.846 | −0.807 | 42.148 |
| 17.0 | 7.809 | −1.004 | 42.208 |
| 17.0 | 8.100 | −1.130 | 42.247 |
| 17.0 | 8.316 | −1.355 | 42.316 |
| 17.0 | 8.423 | −1.643 | 42.404 |
| 17.0 | 8.404 | −1.948 | 42.497 |
| 17.0 | 8.110 | −2.995 | 42.817 |
| 17.0 | 7.817 | −4.043 | 43.137 |
| 17.0 | 7.523 | −5.091 | 43.458 |
| 17.0 | 7.390 | −5.352 | 43.538 |
| 17.0 | 7.165 | −5.547 | 43.597 |
| 17.0 | 6.880 | −5.648 | 43.628 |
| 17.0 | 6.576 | −5.639 | 43.626 |
| 17.0 | 5.649 | −5.456 | 43.569 |
| 17.0 | 4.716 | −5.300 | 43.522 |
| 17.0 | 3.778 | −5.173 | 43.483 |
| 17.0 | 2.837 | −5.073 | 43.452 |
| 17.0 | 1.893 | −5.002 | 43.431 |
| 17.0 | 0.947 | −4.960 | 43.418 |
| 17.0 | 0.000 | −4.945 | 43.413 |
| 17.0 | −0.947 | −4.960 | 43.418 |
| 17.0 | −1.893 | −5.002 | 43.431 |
| 17.0 | −2.837 | −5.073 | 43.452 |
| 17.0 | −3.778 | −5.173 | 43.483 |
| 17.0 | −4.716 | −5.300 | 43.522 |
| 17.0 | −5.649 | −5.456 | 43.569 |
| 17.0 | −6.576 | −5.639 | 43.626 |
| 17.0 | −6.880 | −5.648 | 43.628 |
| 17.0 | −7.165 | −5.547 | 43.597 |
| 17.0 | −7.390 | −5.352 | 43.538 |
| 17.0 | −7.523 | −5.091 | 43.458 |
| 17.0 | −7.817 | −4.043 | 43.137 |
| 17.0 | −8.110 | −2.995 | 42.817 |
| 17.0 | −8.404 | −1.948 | 42.497 |
| 17.0 | −8.423 | −1.643 | 42.404 |
| 17.0 | −8.316 | −1.355 | 42.316 |
| 17.0 | −8.100 | −1.130 | 42.247 |
| 17.0 | −7.809 | −1.004 | 42.208 |
| 17.0 | −6.846 | −0.807 | 42.148 |
| 17.0 | −5.878 | −0.637 | 42.096 |
| 17.0 | −4.905 | −0.493 | 42.052 |
| 17.0 | −3.929 | −0.375 | 42.016 |
| 17.0 | −2.949 | −0.282 | 41.988 |
| 17.0 | −1.968 | −0.217 | 41.968 |
| 17.0 | −0.984 | −0.177 | 41.956 |

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

The invention claimed is:

1. A transition duct comprising:
- an inlet ring;
- an aft frame; and
- a panel assembly extending therebetween and connecting the inlet ring to the aft frame, the panel assembly having an inlet end of generally circular cross section and a center and an outlet end of generally rectangular arc-like cross section, the panel assembly having an uncoated internal profile substantially in accordance with coordinates X, Y, and Z at an angle Θ, as set forth in Table 1, the X, Y, and Z values carried only to three decimal places wherein the coordinates are relative to an origin at the center of the inlet end and taken at a sweep angle Θ that is measured from a first plane defined by the inlet end and increases toward a second plane defined by the outlet end, the planes intersecting at a line about which the angle Θ is measured, and wherein X, Y, and Z are coordinates defining the panel assembly profile at each angle Θ from said inlet end, with X, Y, and Z having an origin at the center of the inlet end, and a z-axis extending perpendicular from the first plane.

2. A transition duct according to claim 1 wherein the panel assembly comprises a first panel and a second panel, the first panel and second panel joined together along a plurality of generally axial seams.

3. A transition duct according to claim 1 wherein the internal profile for the panel assembly can vary up to 0.125 inches due to manufacturing tolerances.

4. A transition duct according to claim 1 wherein the transition duct panel assembly has a two-layer air plasma sprayed coating comprising a bond coating applied along the internal profile of the panel assembly and a top coating applied over the bond coating.

5. A transition duct according to claim 4 wherein the two-layer coating applied along the internal profile has a combined thickness of at least 0.019 inches.

6. A transition duct according to claim 1 wherein the transition duct contains a plurality of cooling holes in the panel assembly.

7. A transition duct according to claim 1 wherein the panel assembly is fabricated from a high temperature nickel-base alloy.

8. A transition duct comprising:
- an inlet ring;
- an aft frame;
- a panel assembly extending between the inlet ring and the aft frame and connected thereto, the panel assembly having an inlet end generally circular in cross section having a center and an outlet end of generally rectangular arc-like cross section, the panel assembly having an uncoated internal profile with an envelope of +/−0.250 inches in a direction normal to any surface formed from coordinate values X, Y, and Z at an angle Θ, as set forth in Table 1, the X, Y, and Z values carried only to three decimal places wherein the coordinates are relative to an origin at the center of the inlet end and taken at the sweep angle Θ, which is measured from a first plane defined by the inlet end and increases toward a second plane defined by the outlet end, the planes intersecting at a line about which the angle Θ is measured, and wherein X, Y, and Z are coordinates defining the panel assembly profile at each angle Θ from the inlet end, with X, Y, and Z having an origin at the center of the inlet end, and a z-axis extending perpendicular from the first plane.

9. A transition duct according to claim 8 wherein the panel assembly comprises a first panel and a second panel, the first panel and second panel joined together along a plurality of generally axial seams.

10. A transition duct according to claim 9 wherein the transition duct further comprises a plurality of cooling holes in the first panel.

11. A transition duct according to claim 9 wherein the transition duct further comprises a plurality of cooling holes in the second panel.

12. A transition duct according to claim 8 wherein the transition duct panel assembly has a two-layer air plasma sprayed coating comprising a bond coating applied along the internal profile of said panel assembly and a top coating applied over said bond coating.

13. A transition duct according to claim 12 wherein the two-layer coating applied along the internal profile has a thickness of at least 0.019 inches.

14. A gas turbine transition duct panel assembly comprising a first panel and second panel fixed together along a plurality of seams, the panel assembly having an inlet end and an outlet end with a first plane established at the inlet end and a second plane established at the outlet end, the panel assembly having an uncoated internal profile within an envelope of +/−0.250 inches in a direction normal to any surface formed from coordinate values X, Y, and Z at an angle Θ, as set forth in Table 1, the X, Y, and Z values carried only to three decimal places wherein the coordinates are relative to an origin at the center of the inlet end and taken at the sweep angle Θ, which is measured from the first plane and increases toward a second plane defined by the outlet end, the planes intersecting at a line about which angle Θ is measured, and wherein X, Y, and Z are coordinates defining the panel assembly profile at each angle Θ from the inlet end, with X, Y, and Z having an origin at the center of the inlet end, and a z-axis extending perpendicular from the first plane.

15. A panel assembly according to claim 14 further comprising a two-layer air plasma sprayed coating comprising a bond coating applied along the internal profile of the panel assembly and a top coating applied over the bond coating.

16. A panel assembly according to claim 15 wherein the two-layer coating applied along the internal profile is at least 0.019 inches thick.

17. A panel assembly according to claim 14 further comprising a plurality of cooling holes in the first panel.

18. A panel assembly according to claim 14 further comprising a plurality of cooling holes in the second panel.

* * * * *